United States Patent [19]

Ryan et al.

[11] Patent Number: 4,820,400
[45] Date of Patent: Apr. 11, 1989

[54] PROCESS FOR REMOVING HAZE FROM DEWAXED HYDROCARBON OIL MIXTURE BOILING IN THE LUBRICATING OIL RANGE (OP-3379)

[75] Inventors: Douglas G. Ryan, Rockaway; Donald B. Trust, Denville; Rudolph R. Savory, Chatham, all of N.J.

[73] Assignee: Exxon Research and Engineering Company, Florham Park, N.J.

[21] Appl. No.: 202,601

[22] Filed: Jun. 6, 1988

Related U.S. Application Data

[63] Continuation of Ser. No. 787,385, Oct. 15, 1985, abandoned.

[51] Int. Cl.⁴ .......................... C10G 33/02; B03C 5/00
[52] U.S. Cl. ........................................ 208/38; 208/28; 208/33; 204/181.8; 204/191; 204/308
[58] Field of Search .................. 208/33, 28, 35, 37, 208/38, 24; 204/181.8, 186, 188, 191, 302, 306

[56] References Cited

U.S. PATENT DOCUMENTS

| | | | |
|---|---|---|---|
| 2,031,210 | 2/1936 | Dillon et al. | 204/24 |
| 2,109,131 | 2/1938 | Fisher | 204/181.8 |
| 2,544,307 | 3/1951 | Fourrier et al. | 208/35 |
| 2,612,465 | 9/1952 | Kiersted, Jr. et al. | 208/38 |
| 2,612,466 | 9/1952 | Kiersted, Jr. et al. | 208/24 |
| 2,726,990 | 12/1955 | Baker | 208/33 |
| 2,754,250 | 7/1956 | Shipman, Jr. | 208/33 |
| 2,772,210 | 11/1956 | Read | 208/33 |
| 3,644,195 | 2/1972 | Gudelis et al. | 208/37 X |
| 4,145,275 | 3/1979 | Hall et al. | 208/38 X |
| 4,255,777 | 3/1981 | Kelly | 361/228 |
| 4,581,112 | 4/1980 | Mintz et al. | 204/188 |

Primary Examiner—Glenn Caldarola
Attorney, Agent, or Firm—Joseph J. Allocca

[57] ABSTRACT

For removing haze from dewaxed hydrocarbon oil mixture boiling in the lubricating oil range which is hazy, the hazy oil mixture is filtered in the filtration stage (201) of a dewaxing plant which is concurrently filtering undewaxed hydrocarbon oil mixture boiling in the lubricating oil range. Prior to filtering, the hazy dewaxed oil mixture is subjected to pretreatment (in pretreatment stage 204) such as to promote removal of haze from the dewaxed oil mixture during filtering. This pretreatment is carried out independently of the undewaxed oil mixture and can involve dilution/chilling with an oil solvent (e.g. liquid propane) and/or introduction of free excess electric charge, for example by charge injection. As an alternative to the pretreatment, the temperature conditions under which filtration takes place may be low enough to promote wax crystallization. The filtration stage may comprise a rotary drum filter (213) in which the undewaxed oil mixture is introduced into the filter vat (10), whereas the pretreated dewaxed oil mixture is sprayed onto the wax cake formed on the rotary filter drum.

11 Claims, 13 Drawing Sheets

PROCESS FOR REMOVING HAZE FROM DEWAXED HYDROCARBON OIL MIXTURE BOILING IN THE LUBRICATING OIL RANGE (OP-3379)

CROSS REFERENCE TO RELATED APPLICATIONS

This application is a continuation of co-pending application Ser. No. 787,385, filed Oct. 15, 1985.

BACKGROUND OF THE INVENTION

This invention relates to methods and apparatus for removing haze from dewaxed hydrocarbon oil mixture boiling in the lubricating oil range. Throughout this specification, it is to be understood that "hydrocarbon oil mixture" and "oil mixture" both mean a hydrocarbon oil mixture boiling in the lubricating oil range.

The problems of wax in lubricating oil are very well known in the art. In the distillation of crude oil, a proportion of wax is present in cuts taken in the lubricating oil range. Some of the wax remains dissolved in the oil, whereas other fractions form a haze as the oil fraction ages at ambient temperatures. Wax in itself is in fact a good lubricant but under comparatively low temperatures such as engine cold start conditions, its presence causes the oil to be thick and viscous and as a result the engine may be hard to turn over at sufficient speed during starting. In addition, wax haze or particulatate matter can lead to plugging of the engine oil filter. Haze manifests itself as a milky or cloudy appearance in the oil and is often caused by wax or by both wax and tiny water droplets being present in the lubricating oil. Typically a minimum of about 0.1% by volume of wax will cause some lubricating oil to look hazy. Therefore the existence of haze caused by the presence of wax crystals or particles detrimentally affects the performance of lubricating oils.

Techniques have been available for many years which enable dissolved wax to be separated from lubricating oil. A well-known approach is to mix an oil solvent with the lubricating oil, chill the mixture to precipitate wax crystals, and separate the wax from the resulting slurry by settling or filtration. "Oil solvent" as used throughout this specification refers to those solvents which when added to an oil mixture result in a lower viscosity for the solvent-oil mixture than for the oil mixture alone. Viscosity reduction is beneficial for enhancing the settling or filtration processes used to separate the precipitated wax from the solvent/oil. Usually, the oil solvent will have the additional property of having a higher solubility for the oil (hydrocarbon oil mixture) than for the wax at any given temperature, so that during chilling of the solvent-oil mixture to precipitate wax, the wax precipitation is enhanced. Liquified hydrocarbon alkanes or alkenes, ketones, toluene or other aliphatics, and light organic chlorides are examples of well known oil solvents. When the wax-laden oil is cooled, then as the temperature of the oil is reduced, different wax fractions start to come out of solution, aided by the oil solvent. Propane is an example of a preferred oil solvent because in addition to its oil solvent properties, it boils or vaporizes at typically encountered conditions of temperature and pressure in propane dewaxing processes, and this in turn leads to an auto-refrigeration effect which can be used to bring about the desired cooling, at least in part, of the wax-laden oil.

The grown wax particles and crystals are separated from the lubricating oil/oil solvent mixture, following the above described propane pretreatment, by means of a suitable mechanical filter. Rotary drum filters are well-known in the art for this purpose. The lubricating oil/oil solvent mixture is brought into contact with a filter cloth, extending around the rotary filter drum, in one angular position of the filter and a wax cake is formed on the filter cloth. In another angular position, the wax cake is washed with a solvent to recover oil from the wax cake and in a further angular position of the rotary filter, wax is scraped from the filter cloth by a scraper or "doctor" blade positioned adjacent the periphery of the rotary filter. The thereby-resulting relatively wax-free cloth then rotates further into contact with the wax-laden mixture of oil and solvent again to collect more wax and this process continues. Since the rate of filtration is directly related to the viscosity of the lube oil/oil solvent mixture, which is lower than that of the lube oil alone, the filtration rate is enhanced.

The wax particles need to be grown as large as possible in the oil solvent pretreatment process, in order to achieve the most effective wax separation by the rotary filters. This requires that the temperature of the wax-laden lubricating oil be reduced very gradually (typically around 2° C. per min). If the temperature were to be reduced more rapidly, much smaller wax crystals would be produced for a given temperature drop. Therefore, the oil solvent pretreatment apparatus has to be specially designed to provide the necessary stringent operating parameters. In addition, dewaxing aids are often used to promote the wax crystallization.

After removal of wax in the rotary drum filter the dewaxed lube oil (DWO) and oil solvent admixture are in general processed in a solvent recovery plant which recovers the oil solvent from the admixture, leaving DWO which is accumulated in oil storage tanks. Generally speaking, the DWO will be found on testing to comply with "specification" requirements but occasionally, due for example to fines breakthrough or malfunction in the dewaxing plant, the lube oil in one of the storage tanks may be determined (usually by visual inspection) to be out-of-specification or hazy. "Out-of-specification" lube oil and "hazy" lube oil are used interchangeably in the specification to refer to DWO which contains sufficient haze that it does not comply with prespecified "specification" requirements. Out-of-specification DWO is too valuable to be discarded and so it has to be processed in some way so as to remove sufficient haze therefrom such that it then complies with specification requirements. The present invention is concerned with improvement in reprocessing out-of-specification lube oil for removing haze therefrom.

DESCRIPTION OF THE PRIOR ART

One form of lube oil dewaxing plant which is very well known in the art employs a dilution and chilling stage, in which approximately 1 to 3 volumes of liquid propane solvent is added to 1 volume of lube oil and the resulting admixture is chilled to precipitate wax crystals from the haze, followed by filtration in a filtration stage in which the wax crystals are separated from the lube oil and propane solvent by filtration. A preferred dewaxing plant of this kind, comprising batch chillers followed by rotary drum filters, is described hereinbelow in some detail with reference to FIG. 1. When using such plant out-of-specification dewaxed oil is reprocessed by recycling through the entire dewaxing plant but this has the disadvantage that the "front end" loading of the dilution and chilling stage is increased, which in effect means that the capacity of the plant to dewax fresh (previously undewaxed or at least not already subjected to dewaxing processing in that plant) lube oil is diminished. Furthermore, the undewaxed lube oil and the hazy dewaxed oil pass together through the dilution and chilling stage into the filter trough or vat in which the rotary drum rotates. Particularly where the out-of-specification DWO was originally dewaxed in the same plant, that plant may again be ineffective for removing the out-of-specification haze, due to the haze-forming particles passing through the filter cloth into the DWO filtrate. In any event, the out-of-specification haze could be removed more effectively if the chilled solvent-diluted hazy DWO could be sprayed onto an already formed wax cake on the rotating filter drum but, because the out-of-specification oil has already been combined with fresh undewaxed feedstock, it necessarily enters the filter vat along with the chilled solvent-diluted undewaxed lube oil, and wax collection therefore has to take place on the porous filter cloth which is a less effective collector of wax than an already formed wax cake.

Of some background interest to the present invention is U.S. Pat. No. 2,772,210 (Read). Read discloses a solvet dewaxing process which could use a propane solvent. The solvent oil mixture is chilled in a chilling zone and then after settling is segregated into oil-containing wax crystals, which passes along one line to a bottom position in the filter vat of a rotary drum filter, and oil-containing fine wax crystals, which passes through another line to a lateral position in the filter vat. The fine crystals plate out on top of the larger crystals which are adjacent the filter cloth.

Reference is also directed to U.S. Pat. No. 2,754,250 (Shipman). In Shipman, wax-bearing oil and solvent are passed through a primary filter which removes wax, leaving hazy oil and solvent which are sent through a valve to a secondary filter from which wax-free oil is withdrawn and taken to a still for solvent removal. Haze-free oil is withdrawn from the still. In effect, therefore, Shipman removes haze from a dewaxed oil merely by passing the dewaxed oil through a second filter.

Finally, U.S. Pat. No. 2,612,466 (Kiersted et al) broadly contemplates effecting filtration in a plurality of filters arranged for series flow for the separation of solids from a feed mixture of solids and liquids such as the separation of wax from mixtures of wax and oil. Solids obtained as filter cake from a preceding filter stage are conducted to a succeeding stage and filtrate from this succeeding stage is comingled with the solids passing to the preceding stage. Fresh solvent is comingled with solids passing through the final filter stage. The desired solid product is discharged as filter cake from the final filter stage while liquid product dissolved in solvent is discharged as filtrate from the initial filter stage. In this way there is counter-current movement of solids and solvent through the system. A portion of the filtrate from a succeeding filter stage may be used as wash solvent for cake washing in a preceding stage.

SUMMARY OF THE INVENTION

In order to remove haze from dewaxed hydrocarbon oil mixture boiling in the lubricating oil range which is hazy, according to the present invention the hazy oil mixture is filtered in the filtration stage of a dewaxing plant which is concurrently filtering undewaxed hydrocarbon oil mixture boiling in the lubricating oil range. "Undewaxed" denotes hydrocarbon oil mixture which has not previously been processed in this dewaxing plant. The filtration of the hazy dewaxed oil mixture is under conditions such as to promote removal of haze from the dewaxed oil mixture during filtering.

One way in which this result can be achieved is to filter the hazy dewaxed oil mixture under low enough temperature conditions such as to promote at least wax haze crystallization, so that wax crystals thereby formed are separated by the filtering. For example, by spraying the hazy dewaxed oil mixture onto a sufficiently chilled wax cake on a rotary drum filter (e.g. at $-30°$ F., the haze will be converted, by the resulting chilling, into wax and ice crystals which are collected on the filter drum. Alternatively, prior to filtering, the hazy dewaxed oil mixture may be subjeced to pretreatment independently of the undewaxed oil mixture, the pretreatment being such as to promote removal of haze from the dewaxed oil mixture during filtering.

In this way, no extra load is imposed upon whatever conditioning of the undewaxed oil mixture takes place in the dewaxing plant prior to filtering the undewaxed oil mixture and providing the filtering stage and subsequent stage for recovery of solvent from filtrate have the capacity to accommodate the extra loading (which will normally be the case, such as when employing one or more rotary drum filters), the capacity of the dewaxing plant to dewax undewaxed oil mixture is undiminished. Furthermore, because the pretreatment of the hazy or out-of-specification dewaxed oil mixture (DWO) is independent of the undewaxed oil mixture, that pretreatment can be "tailored" to optimise the conditioning of the hazy DWO so that by spraying it onto the wax cake formed on a rotary drum filter rotating in a filter vat containing the undewaxed oil mixture, separation of wax from the haze, and, generally, ice crystals too, can be maximised, partly due to improved separation being obtained using the already formed cake and partly due to the specially suited pretreatment of the hazy DWO.

The pretreatment can take one of several forms. For example, the pretreatment may comprise reducing the solubility of the hazy dewaxed oil mixture for wax and water, to promote wax and ice crystallization of haze in the dewaxed oil mixture. Such solubility reduction may be achieved by cooling the hazy oil mixture. Oil solvent mixture may be added to the hazy oil mixture to promote the wax and ice crystallization. In a preferred arrangement, the oil solvent liquid is an auto-refrigerant liquid which partially vaporises so as to reduce the temperature of the hazy oil mixture. Such auto-refrigerant liquid may be liquid propane and the admixture of hazy oil mixture and added propane can be passed through a flash drum or control valve, across which the admixture is flashed, for chilling the admixture.

Generally, before the undewaxed oil mixture is filtered in the filtration stage, auto-refrigerant solvent liquid is added to the undewaxed oil mixture and part thereof vaporised to chill the undewaxed oil mixture and remaining auto-refrigerant liquid to promote at least wax crystallization. In such embodiments, it is possible for a proportion of the dewaxed oil mixture and auto-refrigerant liquid remaining after filtration to be introduced into the hazy dewaxed oil mixture during its pretreatment as an alternative to introducing oil solvent liquid alone into the hazy dewaxed oil mixture.

Other ways exist to alter the solubility of the wax in the hazy dewaxed oil mixture. To hazy dewaxed oil mixture already diluted with an oil solvent liquid can be added a liquid additive which alters the chemical or physical properties of the solvent by chemical reaction between the additive and solvent or, where the additive is a solvent absorber, by the selective absorption of the solvent by the additive. A second example is to utilize the vapor pressure of the oil mixture such as by venting or drawing vacuum to effect temperature reduction. Alternatively, oil solvent vapor in the gas or vapor atmosphere above a body of oil solvent/lube oil can be selectively removed from the atmosphere to bring about wax precipitation, for example using a flash drum.

It is to be noted that wax and lube oil are chemically similar but have differing molecular weights. To facilitate precipitation of dissolved wax, an additive may be used such as a high molecular weight hydrocarbon, containing an amine group.

Preferred oil solvents for separating wax from a hazy hydrocarbon oil mixture include liquid propane or a liquid alkane (e.g. hexane) or alkene whose molecular weight is between 16 and 114, or any other oil solvent whose electrical conductivity is less than about $10^{-8}$ (ohm .m)$^{-1}$. Preferably, the temperature of the hazy DWO is in the range 140° F. to 200° F. before it is mixed with the oil solvent liquid whose temperature is in the range of 60° F. These temperature ranges help to ensure that the oil solvent dissolves thoroughly and readily in the oil mixture.

Another way of pretreating the hazy dewaxed oil mixture comprises electrically treating the hazy dewaxed oil mixture so as to promote haze separation in the filtration stage. Various electrical techniques are known for this purpose such as dielectrophoresis and electrophoresis or corona discharge charging which can enhance the separation of wax and/or water haze from the hazy DWO during filtration. However, whilst such electrical techniques can be used for performing the invention, it is particularly preferred, according to the present invention, that the pretreatment comprise introducing free charge which is net unipolar into the hazy dewaxed oil mixture at least predominantly by electron emission, in such manner as to cause the dewaxed oil mixture to act as a medium through which volumetric distribution of the introduced charge takes place, there being a sufficient excess of free charge introduced such that the volumetric charge distribution promotes separation of wax haze from the dewaxed oil mixture during the filtering. The volumetric charge distribution causes both an electric field to be induced in the dewaxed oil mixture and the haze in dispersed phase form to become charged, and the induced electric field and the charge on the dispersed phase interact to produce an electrical driving force acting on the dispersed phase which enhances the effectiveness of the filtration which takes place in the filtration stage. The nature of the electron emission will be discussed in detail hereinbelow.

Free excess charge introduced into the wax/water containing oil mixture is positive or negative ions which, initially, are free to move through the dewaxed oil mixture. The oil mixture acts as a medium through which volumetric distribution of the introduced charge occurs, so as to establish the induced electric field in the mixture. It is stressed that the electric field is the result not of any voltage applied to any external electrodes so as to set up an electric field between those electrodes, but rather arises from the total introduced or injected charge distribution in the dewaxed oil mixture and on the wax suspension and the collector surface regions (i.e. wax cake in a rotary drum filter) where separation (filtration) occurs.

The basis for the effective separation that can be achieved when introducing free excess charge into the hazy dewaxed oil mixture is believed by the inventors to be as follows. The first step in the process is the production of an excess (i.e. net unipolar - positive or negative) charge density in the otherwise electrically-neutral hazy dewaxed oil mixture. Several techniques are available to produce a transient or steady-excess charge density. Broadly speaking, such methods fall into two general categories, namely: (1) injection of excess charge across the interface or boundary which confines the hazy dewaxed oil mixture, and (2) volumetric charge introduction techniques into the bulk of the oil mixture. Examples of the first category include electron beam and high energy particle radiation, photo-emission and charge transport by a moving fluid. Another example is charge injection as taught in U.S. Pat. No. 4,255,777 (Kelly), the contents of which are expressly incorporated herein by reference and which discloses charge injection predominantly or solely by field emission. Electron beam, photoemission and field emission are all examples of electron emission techniques, and each of them involves minimal or no ionization effects. Examples of the second category are photoionization of either or both of the wax suspension and the oil mixture and secondary ionization by thermalization of high energy particle irradiation of the hazy dewaxed oil mixture. These examples all involve ionic dissociation within the oil mixture.

It is necessary that there be an excess of free charge in the oil mixture in the sense of a sufficient abundance that an effective enhancement of wax separation during filtration will occur. Typically, the density of the free electrons would be of the order of $10^{16}$ charges per m$^3$. A lower limit would be about $1 \times 10^{10}$ charges per m$^3$. A typical preferred range of free charge density is about $1 \times 10^{13}$ to $1 \times 10^{19}$ charges per m$^3$ or even higher, for providing effective enhancement of wax filtration.

The charge introduced into the hazy dewaxed oil mixture to be clarified must be net negative or net positive. However, providing this requirement is met, then it is equally possible to introduce the excess charge using two streams of opposite but unequal levels of charge or alternating net positive and net negative streams for the purposes of wax haze agglomeration prior to collection, in the first case, or multilayer deposition on the wax cake of the rotary filter drum in the second case (e.g., collecting a net negative layer then a net positive layer, and so forth.)

The next step in the electrical charging process is the transference of the major portion of the excess charge to the wax haze. In a preferred way of performing the invention in which a plurality of charge injectors, such as disclosed in the aforesaid U.S. Pat. No. 4,255,777, is used for introducing net unipolar free excess charge into the hazy dewaxed lube oil (with or without added oil solvent), the charged stream issues from each charge injector as a continuous stream or spray through a gas or vapor space under a hood enclosing the filter vat of the rotary drum filter. The gas or vapor space is provided to enable the charged hazy dewaxed lube oil to exit each charge injector with high velocity to efficiently sweep out the injected charge and also to eliminate any charge dissipation path back to the charge injector. Such decoupling of the wax cake on the rotating filter drum from each charge injector is important for achieving a high level and high efficiency of charge injection. It is of no particular importance to the effective removal of the wax haze from the DWO whether the charged hazy DWO is sprayed by the charge injector or simply issues as a continuous stream onto the filter drum wax cake particularly at relatively high velocity throughputs in the charge injector. However, when the haze contaminated DWO is sprayed, the individual oil droplets are in general separated from one another and this can be important where lower throughput velocities, closer to the drift velocity of the individual charges, are employed.

It is explained that hazy DWO sprayed onto the wax cake is drawn through the wax cake under reduced pressure. Some of the sprayed DWO may stream down the wax cake on the filter drum and drip into the filter vat. In this way, charge is imparted to the wax cake and may also be imparted to the undewaxed oil mixture and solvent in the filter vat. This charge transfer has the added benefit of assisting wax and ice collection on the filter cake.

In the filtration zone (i.e. where the charged spray encounters the wax cake and in the filter trough), by whatever means the free excess charge is introduced into the hazy DWO, it is assumed that the excess charge density exceeds the oil mixture background charge density (i.e. the density of bipolar charge carriers which are intrinsic to the oil mixture and which result in the conductivity of the oil mixture); then, the induced electric field in the filtration zone caused by the excess charge density will act on the individual charge carriers and drive them to the boundaries of the hydrocarbon oil mixture. Some of the charge will be intercepted by the wax particles and/or water droplets forming the haze and the wax particles/water droplets will thereby become charged. The interaction which then occurs between the charged wax/water and the induced electric field causes the dispersed wax/water to migrate towards the boundaries of the oil mixture, the principal boundary being the exposed surface of the wax cake on the rotating filter drum.

Some wax crystal growth can be expected to arise as a result of migrating wax crystals colliding with one another while in the DWO streaming down the wax cake and sticking together or agglomerating to form larger wax crystals. This effect occurs predominantly where the mean migration path length for the wax particles is large compared with the mean spacing between the individual wax particles. However, due to the short migration paths involved, most wax particles on average will reach the wax cake without colliding en route with other migrating wax particles, so that wax particle deposition and agglomeration occurs principally on the wax cake. In practice, direct wax particle deposition on the wax cake, or wax particle deposition on the wax cake following agglomeration within the oil mixture, will occur.

It is to be noted that when using a charge injector to introduce the net unipolar free excess charge, it is important that the stream velocity through the charge injector is high enough to transport the charged stream away from the electrode region of the charge injector. Ideally, the stream velocity needs to exceed the drift velocity relative to the DWO of the individual charges induced by the electric field produced by the charge injector electrodes. On the other hand, the charged hazy DWO needs to remain in contact with the wax cake long enough to enable adequate wax haze to be collected and separated from the oil mixture in the rotary drum filter. This generally requires a comparatively long residence time in the rotary drum filter and therefore a much lower velocity throughput in the filter than in the charge injector. A typical value for the throughput velocity in the charge injector might be 1 m/sec whereas the residence time for the charged DWO on the wax cake might typically be 15 sec. By way of example, in another embodiment the internal cross-sectional diameter of the charge injector orifice diameter might be 0.025 cm, so as to provide a high velocity flow in the region where charge injection occurs. These quoted figures are purely exemplary and have no limiting character.

In order further to explain the nature of the preferred way of charging the hazy dewaxed lube oil in the pretreatment stage, it is explained that when operating a charge injector, which comprises a pointed high potential cathode electrode and an adjacent anode electrode plate having a spray orifice therein opposite the tip of the pointed electrode (for example as disclosed in the aforesaid Kelly U.S. patent), at cathode voltages below a threshold voltage (sometimes known as a "corona" or "cut-in" voltage) free electrons are field-emitted into the hazy DWO flowing past the pointed electrode and through the orifice in the anode plate. The flow of hazy DWO sweeps negative free charge downstream from the charge injector while at the same time further free negative charge is field emitted by the cathode and this process takes effect continuously. As the cathode voltage increases (below the threshold voltage), the level of field emission increases.

When the corona threshold is exceeded (but below a breakdown value to be described below), the high potential applied to the cathode produces ionic dissociation in a localised region around the cathode tip. The positive ions in this region or "cloud" are attracted to the surface of the cathode leaving the negative ions which tend to locate themselves more at the downstream side of the cloud. As hazy DWO flows through the anode/cathode arrangement, the cloud, particularly its downstream side, is swept through the anode orifice while simultaneously fresh hazy DWO arriving in the region of the cathode tip itself becomes ionised around the cathode tip. Depending on the flow velocity, some of the negative ions travelling in the vicinity of the anode orifice are attracted into the anode representing a sharp increase in the anode current. The remaining charge, swept downstream, comprises both positive and negative ions but with a predominance of negative ions. However, due to ions of opposite polarity cancelling one another out in the downstream region the net negative charge is significantly reduced as compared with the situation when operating at a voltage just below corona threshold (i.e. with field emission).

As the applied voltage increases further towards the breakdown value, the "cloud" expands towards the anode plate. When the breakdown value is reached, the "cloud" bridges the gap between the cathode and anode and dielectric breakdown occurs. The anode current rises to a large value while the level of net charge in the downstream region falls to substantially zero.

From the foregoing description it will be appreciated that optimum charging exists at a cathode voltage which is just below the "corona" or "cut-in" threshold. The charge injector is then operating predominantly or solely by field emission. It will also be appreciated that charging by a corona discharge technique is less desirable since it results in lower levels of charging and hence reduced separation effectiveness in the filtration stage, whilst if the charging takes place at voltages above the breakdown value, such charging has no beneficial effect on the subsequent filtration. It is also pointed out that when operating below the corona threshold voltage there will generally be little or no ionic dissociation within the DWO. ways of introducing free excess charge accompanied by little or no ionic dissociation within the oil mixture, apart from by field emission, include electron beam and photoemission techniques, as referred to hereinabove. These and other similar techniques in which only minimal ionization effects occur are included in the term "electron emission", as used in this specification.

A third possibility for pretreating the hazy DWO is to combine the beneficial effects of dilution/chilling on the one hand with the introduction of free excess electric charge on the other hand and this represents a particularly preferred way of performing the invention.

Various ways exist for implementing this approach to the pretreatment. In one way an oil solvent liquid such as an auto-refrigerant liquid is added to the hazy DWO to form an admixture which is then chilled to promote precipitation of wax crystals (and ice crystals too if the degree of chilling is sufficient), and then charge is introduced, preferably by charge injection, into the chilled admixture. According to an alternative technique which is preferred where the charge injector(s) or other free charge introducing means are susceptible to becoming plugged with wax or ice deposits, especially where the DWO has a relatively high viscosity, the free charge can be introduced indirectly into the hazy dewaxed oil mixture by firstly introducing it into the auto-refrigerant liquid which has previously been allowed to partially vaporise so as to chill itself, and then intimately mixing the charged, chilled, auto-refrigerant liquid and the hazy dewaxed oil mixture, whereby charge transfers to the hazy dewaxed oil mixture and the chilled auto-refrigerant liquid reduces the temperature of the dewaxed oil mixture to promote wax and ice crystallization of the haze in the dewaxed oil mixture.

Throughout the foreing description reference has been made predominantly to removing the wax haze since the invention is particularly adapted for this purpose. There have, however, been references to producing ice crystals and in this respect it is explained that in general, providing the pretreatment of the hazy DWO and the conditioning of the undewaxed lube oil both involve sufficient cooling, fine water droplets forming haze in the dewaxed and undewaxed lube oils will be converted to ice crystals in each case and these will also be collected on the wax cake of the rotary filter drum. Cooling to such a degree will in fact normally be expected to occur since the cooling has to be sufficient to sustain a typical rotary drum filter operating temperature of about $-30°$ F. in propane dewaxing or $0°$ F. in ketone dewaxing.

Having briefly described the method of this invention, it is pointed out that the invention also finds application to apparatus which can be incorporated in a dewaxing plant for removing haze from dewaxed hydrocarbon oil mixture boiling in the lubricating oil range which is hazy. The dewaxing plant itself can be regarded as comprising means for conditioning an undewaxed hydrocarbon oil mixture boiling in the lubricating oil range for promoting crystallization of at least wax in the hazy undewaxed oil mixture and means for filtering the conditioned oil mixture for removing at least crystallized wax from the oil mixture. The inventive apparatus itself comprises means for feeding the dewaxed oil mixture to the filtering means of the dewaxing plant so that dewaxed oil mixture is filtered in the filtering means but concurrently with filtration of the undewaxed oil mixture. The inventive apparatus also includes pretreatment means for subjecting the hazy dewaxed oil mixture to pretreatment prior to filtering, independently of the undewaxed oil mixture, the pretreatment being such as to promote removal of haze from the dewaxed oil mixture during filtering. As described above, the pretreatment may comprise dilution/chilling and/or electrical treatment, for example by charge injection. As an alternative to such pretreatment, the apparatus may include means arranged to maintain low enough temperature conditions in the filtering means, such as to promote at least wax crystallization of wax haze in the dewaxed oil mixture (whether charged or uncharged) in the filtering means so that resulting wax crystals are separated by the filtering means. For example, the solvent-diluted undewaxed oil mixture may be pre-chilled sufficiently, before introduction into the filter vat of a rotary drum filter that the resulting wax cake formed on the filter cloth is cold enough to produce wax crystallization of wax haze in the dewaxed oil mixture sprayed onto the wax cake.

Where free excess charge is introduced into the hazy DWO (with or without oil solvent) or into oil solvent (which is subsequently intimately mixed with hazy DWO), the free charge introducing means preferably comprises a plurality of charge injectors mounted in at least one of a plurality of spray headers which are mounted inside the hood of the rotary drum filter for spraying through a gas or vapor space onto the wax cake formed on the rotary drum.

BRIEF DESCRIPTION OF THE DRAWINGS

The invention will be better understood from the following description given by way of example and with reference to the accompanying drawings wherein.

In the drawings, the same reference numerals denote the same or equivalent parts.

DESCRIPTION OF THE PREFERRED EMBODIMENTS

Figure 1:
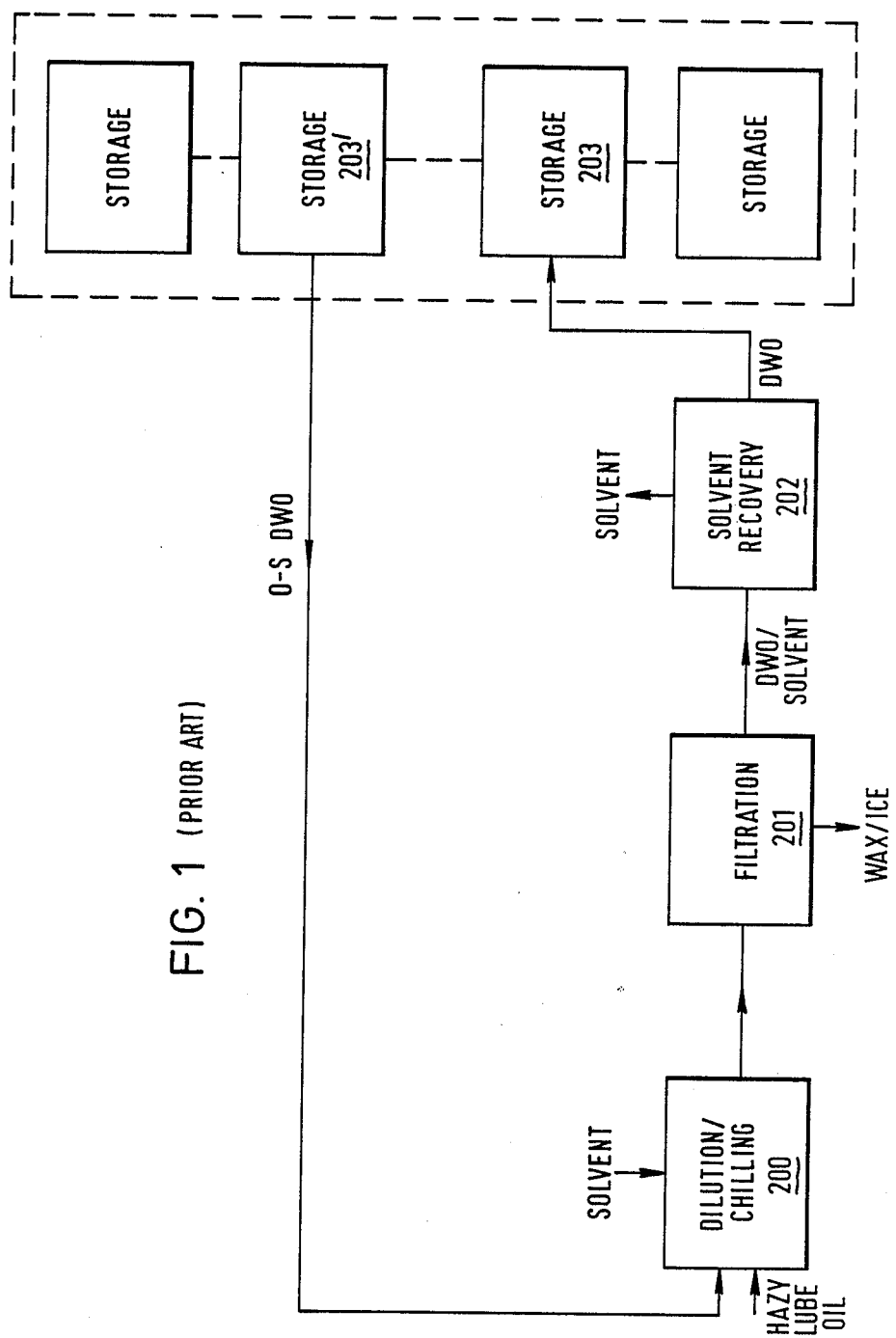
FIG. 1 is a block diagram of a typical known lube oil dewaxing plant, showing how out-of-specification dewaxed lube oil is recycled to remove wax and water haze from the lube oil.

In order to facilitate an understanding of the preferred embodiments to be described with reference to FIGS. 2 to 14, reference is made firstly to FIG. 1 which is a block diagram of a typical known lube oil dewaxing plant. As shown, undewaxed hazy lube oil which contains wax in dissolved and/or dispersed form and dispersed water droplets is fed to a lube oil dewaxing plant which comprises a dilution and chilling stage 200 followed by a filtration stage 201. In the dilution and chilling stage 200, solvent is used to provide favourable conditions for growth of wax crystals and to dilute the resultant chilled slurry so as to permit continuous oil-wax separation using rotary drum filters in the filtration unit 201. One solvent dewaxing process which is used industry-wide is propane dewaxing in which the propane solvent is used both as a diluent and as a refrigerant. As an auto-refrigerant, propane is used to chill the originally warm (around 80° F.) solution of waxy oil and propane to the necessary filtration temperature (about 40° F. below pour point). This propane auto-refrigeration effect is accomplished by evaporation of propane from the warm waxy oil-propane mixture, for example in a batch chiller. Propane is evaporated from the batch over a period of time such that the chilling rate of around 4° F. (2° C.) per minute is achieved. Such a cooling rate is conducive to the growth of large wax crystals with the resultant good filtration properties. As a result of the dilution and chilling which takes place in the dilution and chilling stage, the slurry entering the filtration stage 201 contains wax particles or crystals and ice crystals which are separated from the lube oil and solvent by the rotary drum filters or separators of the filtration stage. Ways of diluting and chilling a hazy lube oil feed using a solvent and then filtering the resulting slurry to remove the wax crystals together with any ice crystals which are also formed from dispersed water droplets in the initial hazy lube oil feed are well known in the art, and need not be further described herein in any detail, although the chilling and dilution stage and filtration stage depicted in FIG. 3 exemplify a preferred way of dewaxing hazy lube oil and are described hereinbelow.

The filtration stage 201 removes wax and ice crystals from the oil slurry feed leaving a mixture of dewaxed oil (DWO) and solvent which is then passed to a solvent recovery stage 202, which removes the solvent to yield dewaxed oil (DWO) which is then fed to an oil storage tank 203. As indicated, that oil storage tank is usually sited at the refinery along with a number of other tanks so that when storage tank 203 is full, further DWO from the solvent recovery stage can be piped to another oil storage tank.

The stored DWO is periodically tested to check that it complies with "specification" requirements. Occasionally, the dewaxed lube oil does not, and in FIG. 1 reference 203' denotes a storage tank containing dewaxed lube oil which is out-of-specification ("O-S" DWO) or hazy. It is remarked that storage tank 203' need not necessarily be grouped with the other storage tanks 203. Furthermore, it may have been filled from a different dewaxing plant or the same dewaxing plant. Conventionally, as shown in FIG. 1 the hazy lube oil in tank 203' is recycled through the entire dewaxing plant, starting at the dilution and chilling stage 200. It will be appreciated that the out-of-specification DWO recycled through the chilling and dilution stage 200 imposes extra load on that stage so that the effective capacity of the plant to treat fresh hazy lube oil is reduced. Furthermore, the recycled DWO will be subjected to the same or similar dewaxing conditions which were imposed during its initial treatment and the crystals in the recycled out-of-specification DWO will generally be very much smaller than those removed during the initial dewaxing treatment. Therefore, it can be expected that the dewaxing retreatment of the recycled DWO may still not improve its quality sufficiently for it to return to "specification" requirements even when treated along with fresh undewaxed lube oil which had not previously been treated in the plant. Additionally, when using rotary drum filters to pick up the wax in the vat or trough of each rotary filter, the wax is collected on the porous filter cloth of the filter which is a less-effective collector than would be the case if the wax could be collected on the already formed wax cake itself. The arrangement according to the present invention shown in block diagram form in FIG. 2 is improved in the first two of the foregoing respects and according to the preferred arrangements of FIGS. 3 to 14 achieves an improvement in the third respect too.

Figure 2:
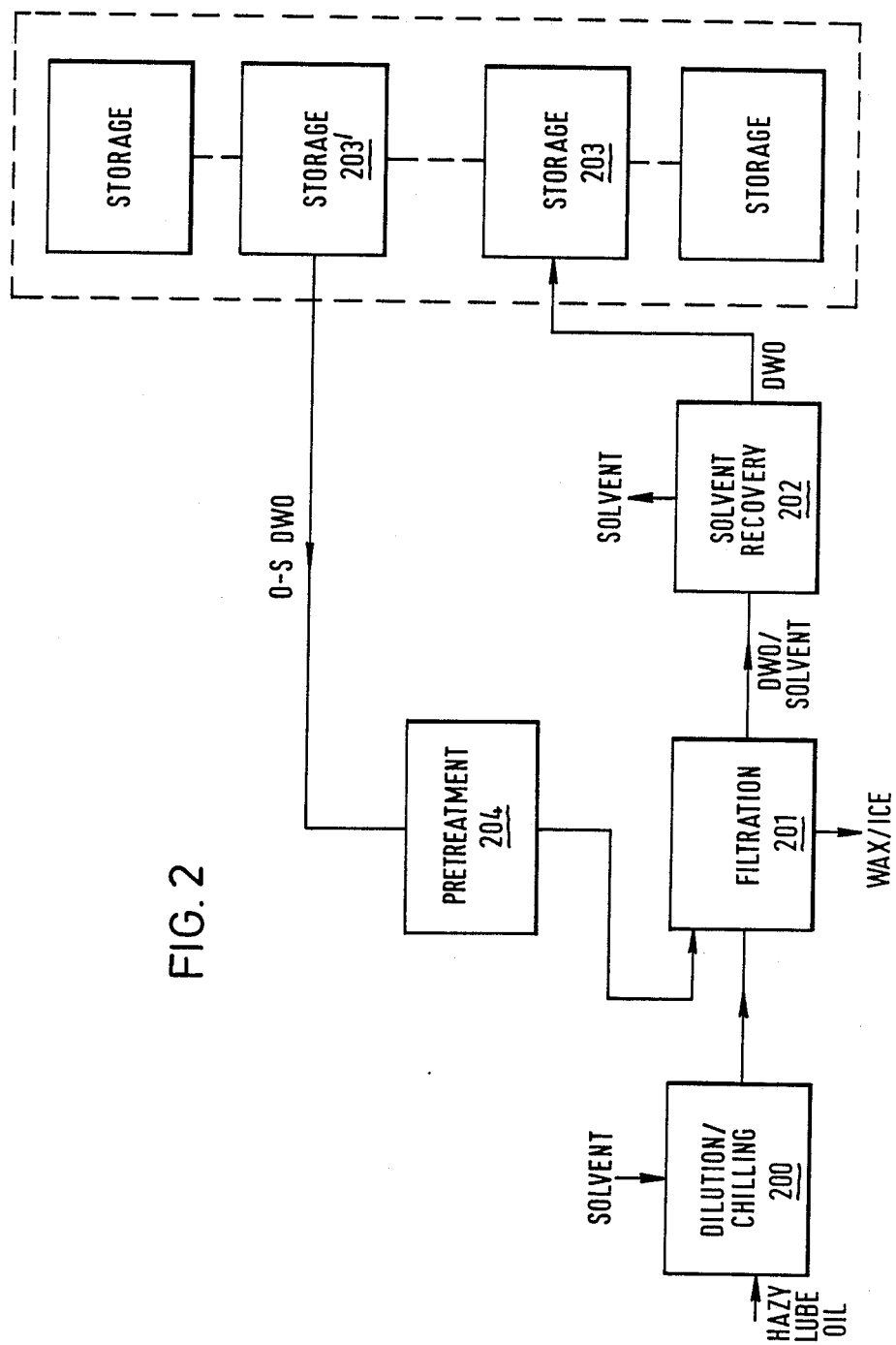
FIG. 2 is a block diagram showing how the present invention may be put into effect by recycling out-of-specification dewaxed lube oil through a pretreatment stage followed by the filtration stage of the dewaxing plant.
Figure 3:
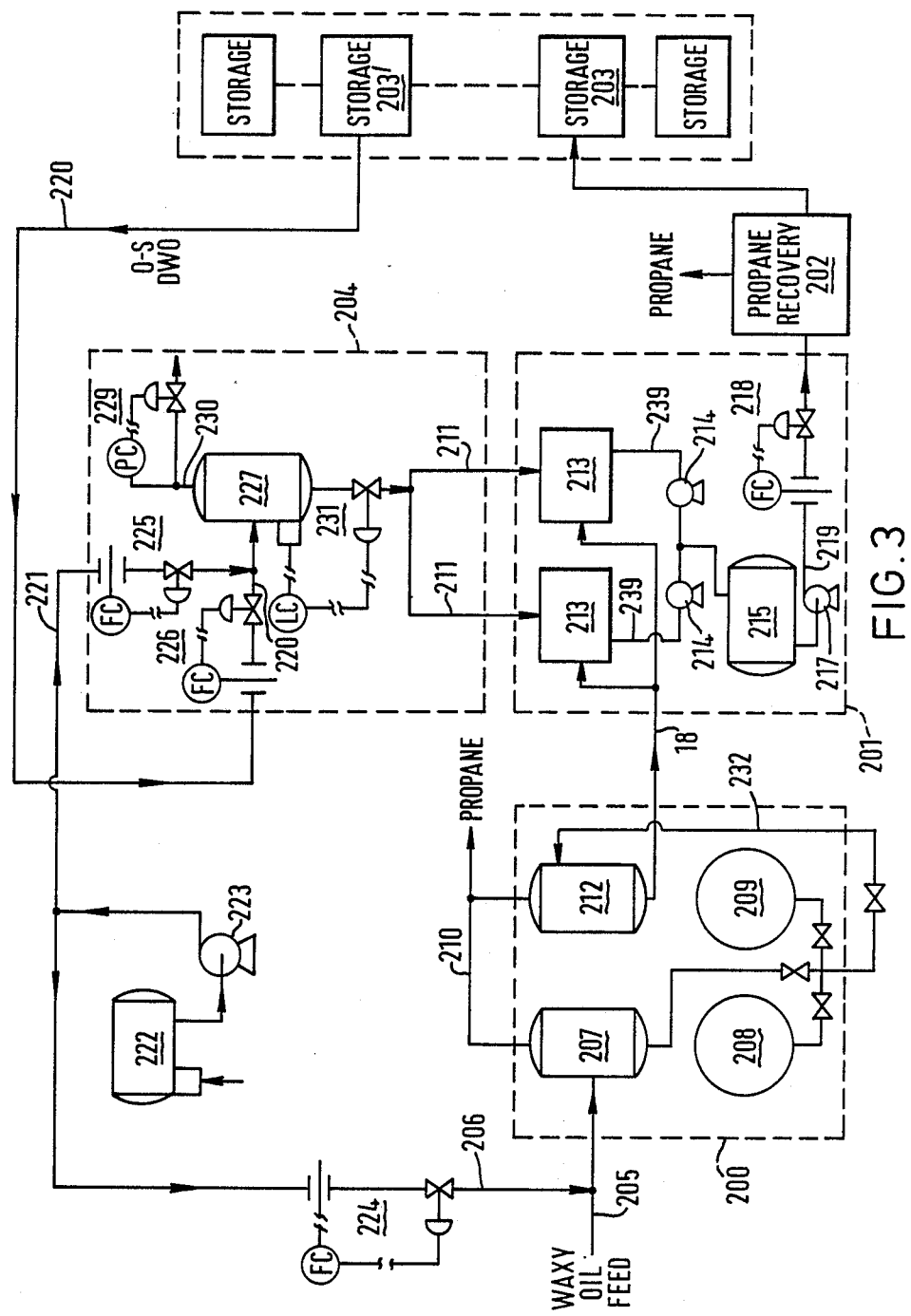
FIG. 3 is a more detailed drawing of a first arrangement for realising the block diagram shown in FIG. 2 in which, in the pretreatment stage, propane is added to the recycled hazy or out-of-specification dewaxed lube oil and the resulting slurry is chilled in a flash drum before being introduced into the filtration stage.
Figure 4:
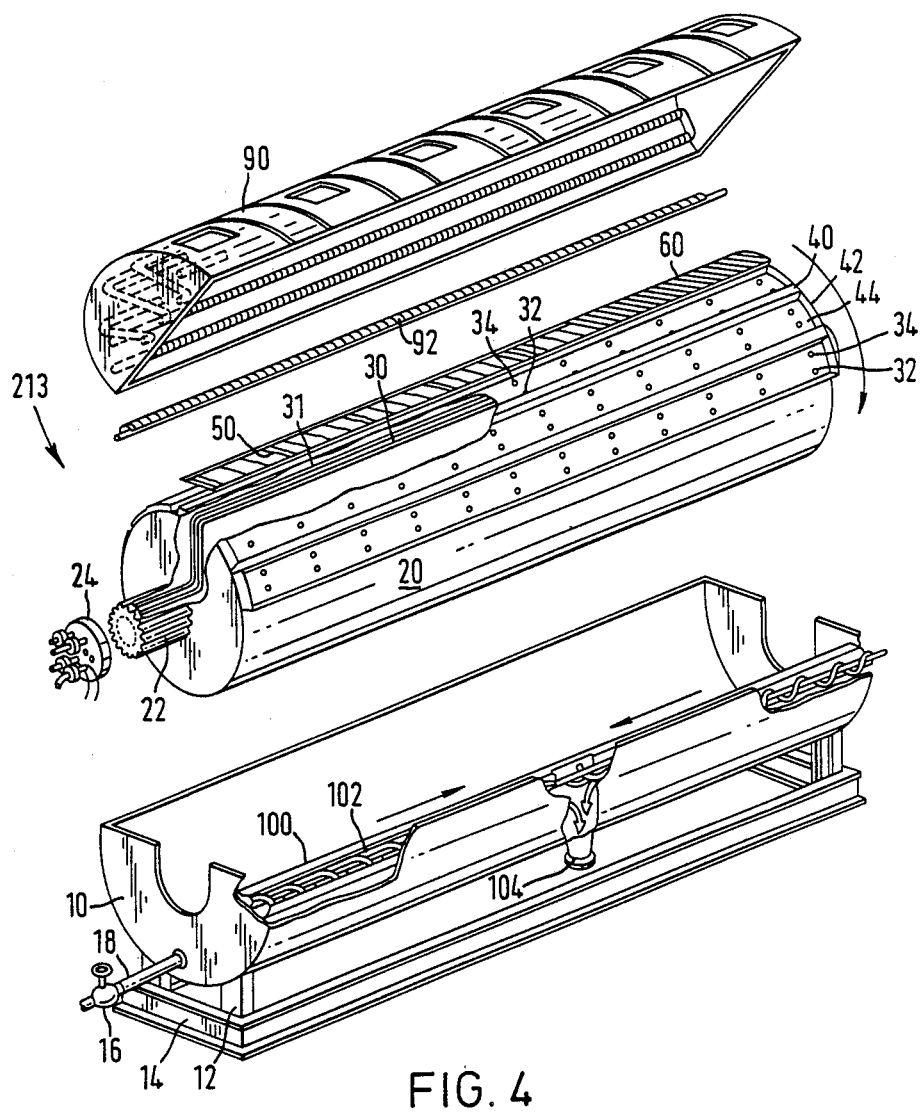
FIG. 4 is an exploded perspective view of a rotary drum filter employed in the filtration stage.
Figure 5:
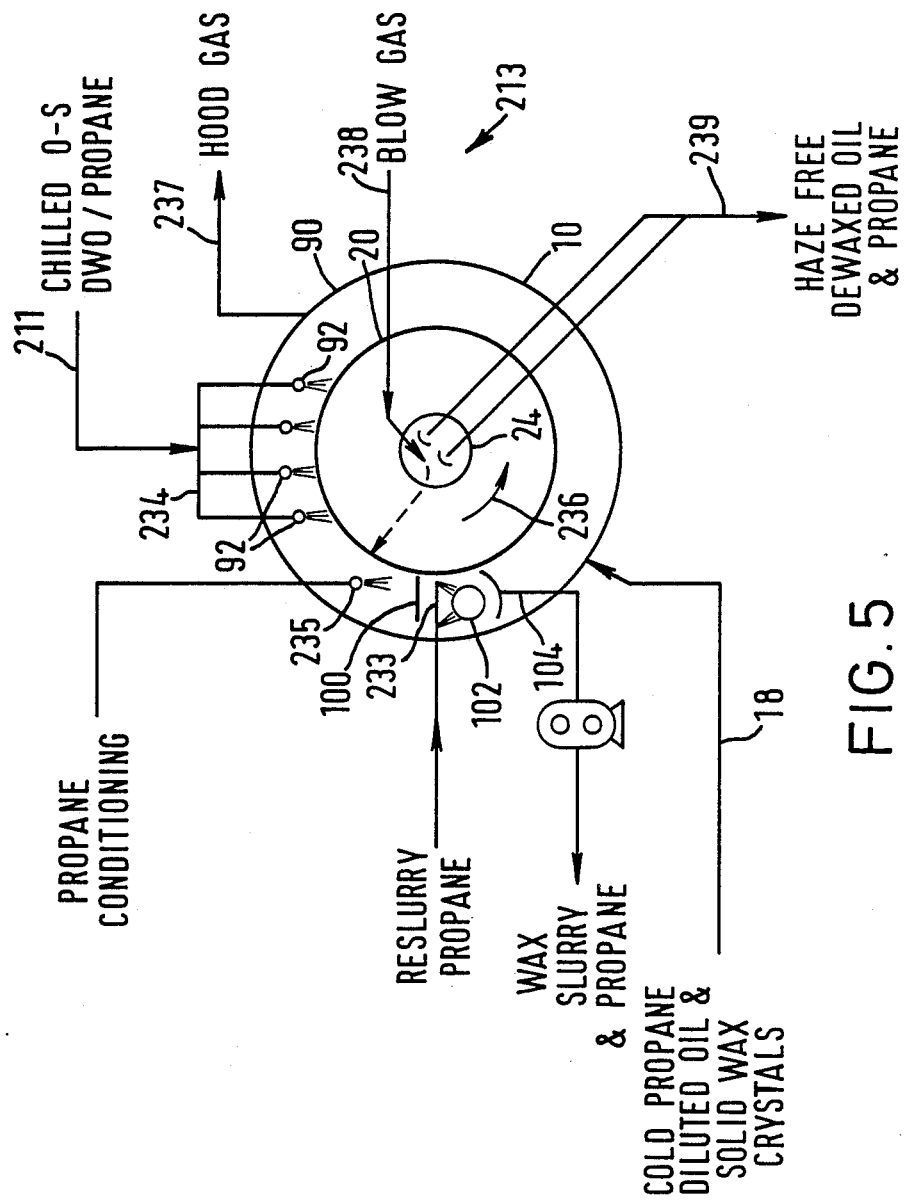
FIG. 5 is a diagrammatic view of the rotary drum filter in end elevation (viewed from the far end (drive end) of the filter shown in FIG. 4) indicating how various lines are connected to the filter unit.

Referring to FIG. 2, the lube oil dewaxing plant comprising the chilling and dilution stage 200, the filtration stage 201 and the solvent recovery stage 202 function as described above with reference to FIG. 1 to produce DWO which is stored in storage tank 203. However, out-of-specification DWO in tank 203', rather than being recycled back to the dilution and chilling stage 200, is recycled, according to the present invention, back through a pretreatment stage 204 and then introduced into the filtration stage 201. The pretreatment which takes place in pretreatment stage 204 has the effect of conditioning the out-of-specification DWO in such manner than when it is passed into the filtration stage 201, a large proportion or substantially all of at least the wax in the haze (wax and water droplets) in the DWO will be removed by the filtration stage. The conditioning which takes place in pretreatment stage 204 to promote formation of wax and ice crystals which can be removed in the filtration stage can be in one of several forms. One possibility is to add an auto-refrigerant solvent to the out-of-specification DWO and then chill the oil/solvent mixture to promote precipitation and formation of wax and ice crystals. The resultant dilution ratio of propane to hazy oil in the chilled mixture should be around 1:1 by volume. The chilled oil solvent mixture temperature should preferably be close to the filtration temperature employed in filters 213. FIGS. 3 to 5 show an embodiment of this kind. Another alternative is to add the solvent but not to chill the resulting hazy DWO/solvent mix initially and to rely on a sufficiently low temperature for the wax cake on a rotary drum filter in the filtration stage to provide the necessary chilling. In a modification (FIG. 6, a proportion of "specification" dewaxed oil and propane leaving the filtration stage is recycled back and introduced into the recycled out-of-specification DWO and the resulting mixture is then chilled close to the filtration temperature, by evaporation of the propane which is present, to precipitate wax and ice crystals. A fourth possibility is to inject free excess charge which is net unipolar into the recycled out-of-specification DWO. As described in more detail in the introductory part of the specification, the effect of the introduced or injected charge is that the fine wax crystals and particles and ice crystals become charged and this charge enables them to be filtered more readily in the filtration stage 201. FIGS. 7 to 10 represent an embodiment of this kind. A particularly preferred arrangement is to combine the beneficial effects of both charge injection and solvent, e.g. propane, addition and two such embodiments are disclosed with reference to FIGS. 11 to 14. In FIG. 11 propane is added to the out-of-specification DWO followed by charge injection into the resulting mixture, whereas in FIGS. 12 to 14 charge is injected into the propane solvent and then the charged propane and out-of-specification dewaxed oil combined.

Referring now to each of these embodiments in turn, in FIG. 3 the dilution and chilling stage 200 comprises a batch chiller of essentially known construction. Waxy oil feed at a temperature above its cloud point (e.g. 140°–180° F.) is fed along line 205 into which a measured proportion of liquid propane solvent (typically in the volumetric dilution ratio range of 1 to 3 and a temperature typically of around 100° F.), determined by a flow control valve arrangement 224, is introduced along line 206, and the waxy oil/propane mixture is precooled in a precooler (not shown for simplicity) to a temperature (about 80° F.) above the cloud point for the oil/propane mixture (i.e. the temperature at which wax particles start to come out of solution), whereupon it is introduced into a feed drum 207, in which a quantity of propane-diluted waxy oil is stored. From there the propane-diluted waxy oil is fed to a minimum of two batch chillers but for simplicy in the embodiment illustrated, just two batch chillers 208, 209 are used. In embodiments having more than two chillers the chillers are arranged into two groups with the chillers of each group interconnected. In either case a batch of propane/waxy oil can be treated in one batch chiller (or group) while the other one is emptied and refilled and vice-versa, so that in effect the facilities upstream and downstream of the batch chilling can be operated continuously.

Some of the dissolved liquid propane in feed drum 207 vaporises and propane vapor is conveyed away from the feed drum along line 210. Only a small temperature drop normally occurs in feed drum 207 in order that the temperature of the propane/waxy oil entering batch chiller 208 or 209 remains marginally below the cloud point of the oil-solvent mixture.

Each batch chiller 208, 209 is generally spherical in shape. It has already been remarked that alternately one chiller is used to chill a batch of propane-diluted waxy oil, while the other chiller is emptied into drum 212 and then refilled from drum 207. Once admitted to one of the chillers, the mixture is cooled at a controlled rate by continuous evaporation of propane under carefully controlled conditions. The pressure in the chiller filled with warm (80° F.) propane-diluted waxy oil is approximately 10 atmospheres. The propane vapor is conveyed along lines, which have been omitted for simplicity, from the spherical batch chillers 208, 209 to propane line 210 which is maintained at low pressure, e.g. 3–5 psig. Typically, a batch of the mixture of waxy oil and propane is chilled from about 80° F. to the necessary filtration temperature in about 30 minutes to provide a chilling rate of about 4° F. per minute, after which the chilled slurry at a temperature around 40° F. below the required DWO pour point is emptied from batch chiller 208 along line 232 to a filter feed drum 212. Due to the cyclic nature of the batch chilling operations, periodic opening and closing of numerous large motor-operated valves is necessary. Such valves are depicted in FIG. 3 but not referenced since the batch chiller arrangement which has been described above is very well known in the art and need not be described in any further detail herein. As is also well known, various pressure, flow and/or level control arrangements are generally needed in a practical realisation of the batch chiller arrangement but for simplicity are not depicted in FIG. 3 or described.

The chilled slurry flows by gravity from the filter feed drum along a line 18 to a minimum of two rotary drum filters 213 which share the load. For simplicity, only two rotary drum filters are shown in FIG. 3. As described in detail below, these filters remove wax and ice crystals from the chilled slurry and the remaining dewaxed lube oil admixed with liquid propane is pumped along line 239 by pumps 214 to a DWO solution drum 215 (or merely flows along line 239 under gravity), from where the oil/propane admixture is pumped by pump 217 to propane recovery stage 202. A flow control valve arrangement 218 regulates the flow of DWO and propane in line 219 between pump 217 and propane recovery stage 202. Suitable propane recovery plants are very well known in the art and need not be described herein. The resulting dewaxed oil is then piped away to storage tank 203.

As described so far, the construction of the dewaxing plant is entirely conventional. However, in order to reprocess the hazy or out-of-specification DWO in storage tank 203', it is pumped along line 220, into which liquid propane is introduced along line 221 from a propane surge drum 222 by means of a pump 223 which also supplies liquid propane along line 206. The relative proportion of propane and out-of-specification DWO admixed in line 220 is typically about 2:1 and the respective flows are controlled by respective flow control arrangements 225 and 226 and the admixture is admitted into a flash drum 227. Flashing of the propane occurs at high pressure across valve 225 and in drum 227, resulting in the admixture of hazy DWO and propane being chilled (producing a temperature reduction typically of 20°–30° C.) to promote formation of wax and ice crystals. The flash drum pressure is controlled at about 2 atmospheres by a pressure regulating arrangement 229 in a propane vapor vent line 230 leading from the flash drum 227, and the liquid level in the flash drum is regulated by a level control arrangement 231. Chilled DWO and propane mixture in an approximately equi-volume ratio pass along lines 211 and are introduced respectively into the rotary drum filters 213.

The construction of each rotary drum filter 213 will now be described with reference to FIG. 4 in which an exploded, simplified isometric assembly drawing of a typical rotary drum filter is shown. The filter includes a filter vat, generally indicated as 10, and a filter drum generally indicated as 20. Vat 10, having a substantially semicylindrical shape, is supported by columns 12 above base 14. Line 18 from the filter feed drum 212 communicates with vat 10. A level controller (not shown) may be added to control the level of slurry in vat 10 by regulating valve 16 in line 18. A filter hood 90 having an overall semicylindrical shape has a plurality of perforated spray headers or drip pipes 92 (hereinafter referred to as "spray headers" for convenience) disposed therein parallel to the axis of rotation of drum 20. The spray header perforations or orifices are uniformly spaced-apart along the length of each spray header and spray or sprinkle the recycled out-of-specification DWO and propane admixture supplied by line 211 (FIG. 3) onto the wax cake formed on the drum as hereinafter described. The small pressure reduction produced by spraying the out-of-specification DWO and propane admixture through the header orifices results in a small, further temperature reduction of typically 2°–3° C. Filter drum 20 is of a generally overall cylindrical shape having a diameter slightly less than that of the diameter of vat 10, such that drum 20 is rotatable about its axis in vat 10 on a pair of trunnions 22. One of the pair of trunnions 22 has a plurality of holes therein, each of which communicates with conduit means such as fluid conduits 30 and 31 and with trunnion valve means 24 to perform varying operations during each revolution of drum 20 as described hereinafter. The other trunnion communicates with a conventional drum rotation means (not shown) to rotate drum 20 in vat 10. Each conduit 30 and 31 extends along substantially the entire axial length of drum 20. A series of uniformly spaced channel sections 40 extend outwardly from the curvilinear surface of drum 20 parallel to the axis of rotation. Terminal sections 42 disposed near the ends of drum 20 connect each section 40 to an adjacent channel section, to thereby define a series of segments 44 circumferentially disposed around drum 20. Each segment 44 has two series of circumferential openings through drum 20 evenly spaced along substantially the entire axial length of each segment to form circumferential rows with one series of openings 32 in general alignment with fluid conduit 30 and with the other series of openings 34 in general alignment with fluid conduit 31. In each segment 44 the leading opening 32 in the direction of rotation hereinafter is referred to as the lead opening while the immediately adjacent trailing opening 34 is referred to as the lag opening.

A means for removing the filter cake from filter cloth 60 such as doctor knife 100 disposed in a compartment in vat 10 is shown which discharges the filter cake into a screw conveyor 102 which directs the filter cake out of vat 10 through outlet 104.

Within each segment 44 is disposed a filter grid 50 to maintain filter cloth 60 spaced apart from drum 20. Filter cloth 60 is stretched over channel sections 40 and grids 50 and is retained in position by a caulking bar (not shown) compressingly inserted in channel section 40 and by circumferential wires (not shown). A baffle (also not shown) may be disposed between grid 50 and filter cloth 60 in substantial alignment with at least one circumferential opening. It has been found that the liquid remaining in conduit 31 tends to be blown to the ends of the conduit when gas is passed outwardly through conduit 31, while flow to conduit 30 is blocked by means of trunnion valve 24. Accordingly, baffles preferably should be located in substantial alignment with at least certain of the circumferential openings 31 at the ends of drum 20 to decrease the erosive effects of the liquid on filter cloth 60. The baffles form no part of the present invention but further details are disclosed in U.S. Pat. No. 4,309,288 (Ryan et al) assigned to the present assignees, the contents of which are incorporated herein by reference.

A typical filter for the separation of wax from lube oil has a filter drum 20 thirty feet in length and eleven and one-half feet in diameter. This drum has an effective filtering area of approximately 1000 square feet with 720 two-inch diameter circumferential openings 32, 34 disposed about the drum substantially as shown in FIG. 4. It is sufficient for the drum 20 to rotate comparatively slowly, e.g. in the range 0.1 to 5 rpm.

FIG. 4 illustrates the main components of each rotar drum filter 213. However, certain other details are omitted from FIG. 4 for clarity but are shown in FIG. 5 to which reference is now made. In addition to the components already described, the rotary drum filter 213 includes a reslurry propane spray manifold 233, positioned above the screw conveyor 102, which sprays cold liquid propane onto the wax scraped from the filter cloth 60 by the doctor knife 100 so as to "reslurry" the wax to facilitate conveying that wax from the filter 213 to the wax solvent recovery facilities (not shown) of the plant. As shown, the rotary drum filter includes four circumferentially spaced-apart spray headers 92 extending parallel to the drum axis which are fed with chilled recycled oil/propane from a manifold 234 supplied from line 211. A further spray header or drip pipe 235, which also extends, inside hood 90, parallel to the drum axis, is used for spraying conditioning propane onto the filter drum and is located in a lag position relative to the four spray headers or drip pipes 92, having regard to the direction of drum rotation which is indicated by arrow 236 in FIG. 5. Gas (mainly propane vapor) inside the filter hood 90 is removed along line 237. As will be explained in more detail hereinbelow, purge and "blow" gas can be introduced into the drum filter 213 along line 238 and through trunnion valve 24.

The varying operations performed simultaneously by a typical rotary filter such as that of FIG. 4 will now be described with particular reference to FIG. 5. When a point on filter cloth 60 is in a position included within the bottommost sector which corresponds with the drum portion which is submerged in the cold propane diluted oil and wax and ice crystals in the filter trough, that point is at reduced pressure relative to the pressure in the vapor space inside the filter hood. Filtrate is drawn through filter cloth 60, circumferential openings 32 and 34 and fluid conduits 30 and 31, respectively, and flows along line 239. The solid wax and ice crystals are retained on filter cloth 60 and build up to form a wax filter cake. As the point on filter cloth 60 continues to rotate, that point rises out of the slurry. Suction continues to be applied to continue to draw any remaining filtrate through circumferential openings 32 and 34 and fluid conduits 30 and 31, respectively, thereby further drying the filter cake.

When the point rotates still further to a position within a sector including the four spray headers 92, chilled recycled oil/propane is sprayed or sprinkled onto the filter cake while suction continues to be applied. Wax and ice crystals in the chilled recycled oil/propane are retained on the wax cake while the resulting haze-free DWO and propane are withdrawn along conduits 30, 31.

It is remarked that the relatively fine wax and ice crystals in the chilled recycled hazy DWO and propane admixture feed to the spray headers 92 are separated much more effectively on the already-formed, cold, wax cake on the filter cloth than if they had been recycled through the entire plant, as in FIG. 1, in which case they would be collected on the filter cloth of the rotary drum filter, the filter cloth being a less effective collector than the already formed wax cake itself. Therefore, it is strongly preferred that the recycled hazy DWO and propane be sprayed onto the wax cake rather than merely being reintroduced directly into the chilled, propane-diluted waxy oil feed from the dilution and chilling stage 200 to the filtration stage 201. However, this latter alternative does represent a possible embodiment of the present invention and can be made to work quite effectively since the propane dilution and chilling of the recycled hazy DWO can be optimised for achieving ideal crystallisation conditions for the wax and water haze that is to be removed.

When the point on filter cloth 60 rotates still further, valve means 24 continues evacuation of fluid conduits 30 and 31 while a conditioning fluid (such as propane) is sprayed through spray header 235 in filter hood 90 to wash filtrate from the wax cake and also to harden up the cake so as to facilitate discharging the cake from the filter cloth by blow gas. The conditioning propane passes through the wax cake, filter cloth 60, circumferential openings 32, 34 and fluid conduits 30, 31, respectively for removal from the filter.

When the point on filter cloth 60 rotates to a position in a sector between spray header 235 and doctor knife 100, the filter cake is again dried by discontinuing external conditioning flow and continuing to apply suction to the sector which pulls conditioning propane from the wax cake through circumferential openings 32, 34, and fluid conduits 30, 31, respectively.

As the point rotates still further to a sector between the last-mentioned sector and doctor knife 100, purge gas, typically having a velocity of about 100 feet/second at openings 34, is supplied to fluid conduit 31 communicating with lag opening 34 while the immediate adjacent lead opening 32 continues to be maintained under suction. This serves to cause some of the liquid remaining in fluid conduit 31 communicating with lag opening 34 to flow into fluid conduit 30 communicating with lead opening 32.

As the point rotates still further (but still before reaching the position of the doctor knife 100), lead opening 32 is no longer evacuated. The purge gas, which is called blow gas at this point, plus any remaining liquid in fluid conduit 31 communicating with lag opening 34 is discharged against an abovementioned baffle and, after deflection, contacts filter cloth 60, causing the cloth to billow out slightly, thereby facilitating the subsequent removal of the cake by doctor knife 100. It should be noted if baffles were not installed in the subject filter, liquid remaining in conduits 30 would be conveyed by the high velocity purge gas against filter cloth 60 causing the cloth to erode, particularly at the ends of drum 20 where the liquid tends to collect.

With regard to the relative sizes of the sectors described, it is to be understood that the length of time that any given point on filter cloth 60 spends in a particular sector may be adjusted by varying the size of the sector and by varying the rate of rotation of drum 20.

It is remarked that in FIG. 3 only the major items of the filtration stage have been shown for simplicity. As in the case of the chilling and dilution stage 210 specifically described, the filtration stage comprising a pair of rotary drum filters 213 is well known in the art and therefore details of less important pipe connections, control valve arrangements etc. have been omitted from FIG. 3 for clarity. On the other hand, the pretreatment stage 204 has been described and illustrated in detail.

From the foregoing description of FIGS. 3 to 5 it will be appreciated that three advantages are obtained over use of the known dewaxing plant as described with reference to FIG. 1. Firstly, no extra load is placed upon the dilution and chilling stage 210 and since the rotary drum filters 213 have ample capacity to cope with the propane-diluted hazy dewaxed oil in addition to the propane-diluted waxy oil/propane slurry from the dilution and chilling stage, the capacity of the plant to handle waxy oil feed is undiminished. Secondly, the cold wax cake already formed on the filter cloth of each rotary drum filter 213 represents a more-effective collector of the fine wax and ice crystals contained in the propane-diluted hazy DWO from the flash drum 227 than would be the case if that hazy DWO were to have been recycled through the chilling and diluton stage and as a result introduced into the filter vat of each rotary drum filter 213. Thirdly, the chilling and dilution stage 200, the filtration stage 201, propane recovery stage 202 and storage tanks 203 collectively form a standard known batch chilling dewaxing plant and the embodiment of FIG. 3 merely represents a simple addition to this known plant in the form of the pretreatment stage 204 together with the necessary line interconnections/modifications. The cost of installing and operating the extra equipment is relatively small and it does not necessitate installing an entirely new plant.

Figure 6:
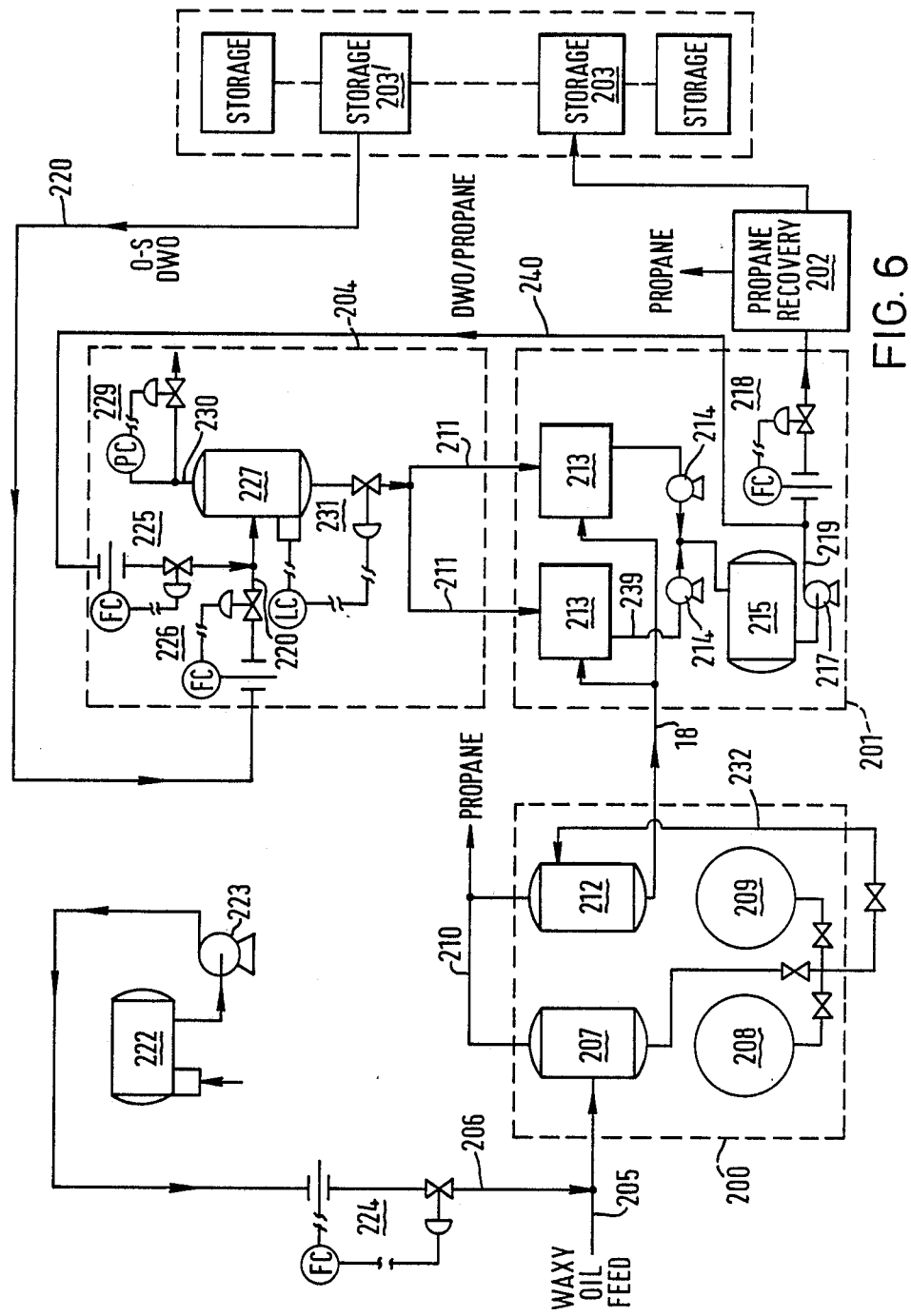
FIG. 6 is a view of a modification to FIG. 3 in which, in the pretreatment stage, a proportion of "specification" dewaxed oil and propane from the filtration stage is introduced into the recycled out-of-specification dewaxed lube oil feed to the filtration stage and the resulting slurry is then passed into the flash drum of the pretreatment stage.
Figure 7:
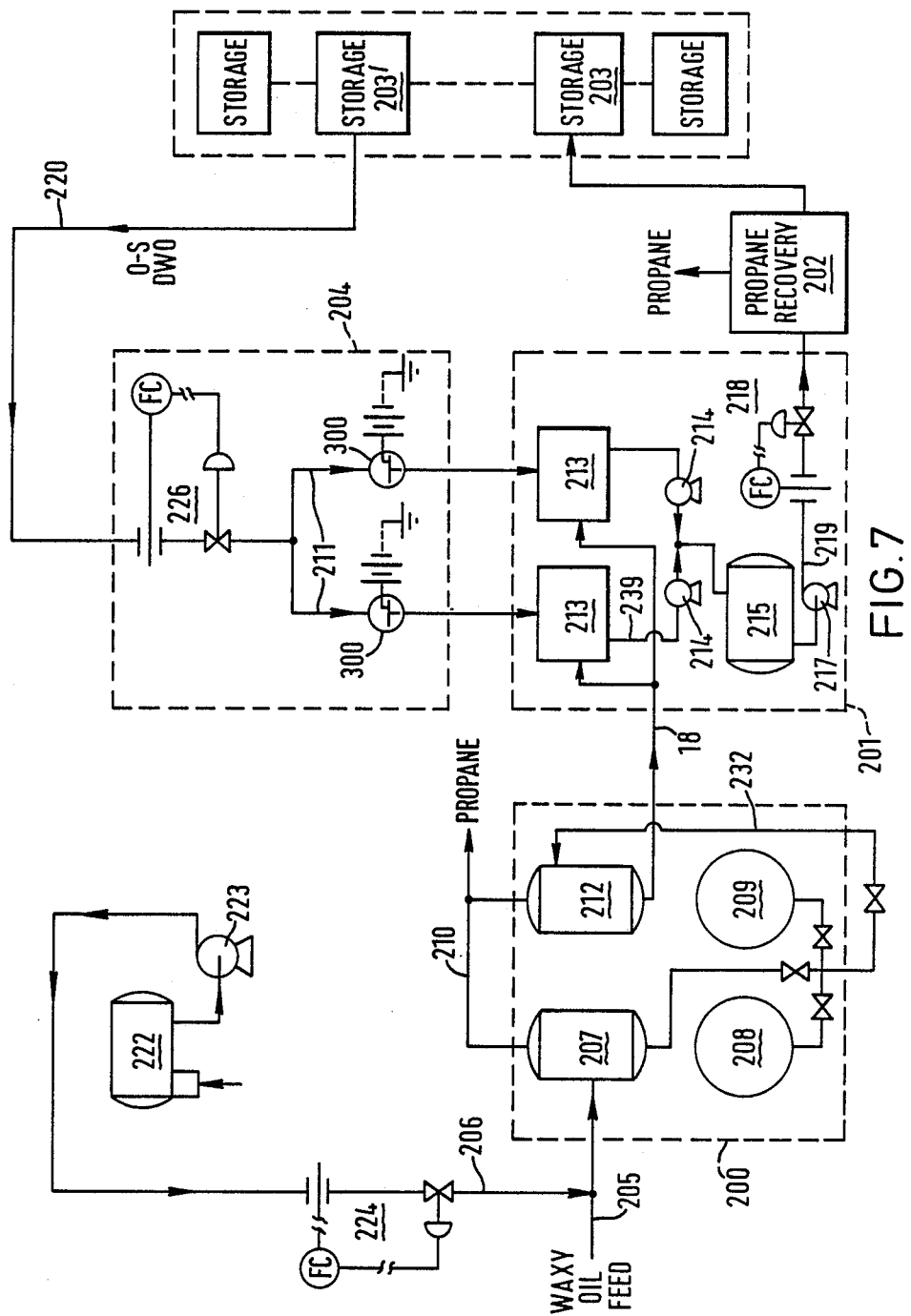
FIG. 7 is a similar view to FIG. 3 showing yet another modification in which no propane is added to the recycled out-of-specification dewaxed lube oil but instead the pretreatment of the recycled hazy oil involves injection of charge into the oil before that oil is introduced into the filtration stage.

Referring now to the embodiment of FIG. 6, this is essentially the same as in FIG. 3, except that instead of introducing liquid propane into the recycled hazy DWO in line 220, a proportion of the DWO and solvent pumped along line 219 from the DWO solution drum 215 is branched off in line 240 and a controlled flowrate of the DWO/solvent admixture, determined by flow control valve arrangement 225, is introduced into the out-of-specification DWO recycled along line 220. The resulting admixture is passed through flash drum 227, in which some of the propane present vaporises to chill the admixture which is then delivered to the rotary drum filters 213 of the filtration stage 201. It is assumed that the DWO content of the admixture pumped along line 219 is "specification" DWO but even if not, the rotary drum filters 213 will remove haze from both the recycled hazy oil from storage tank 203' and also the recycled DWO/propane.

Figure 8:
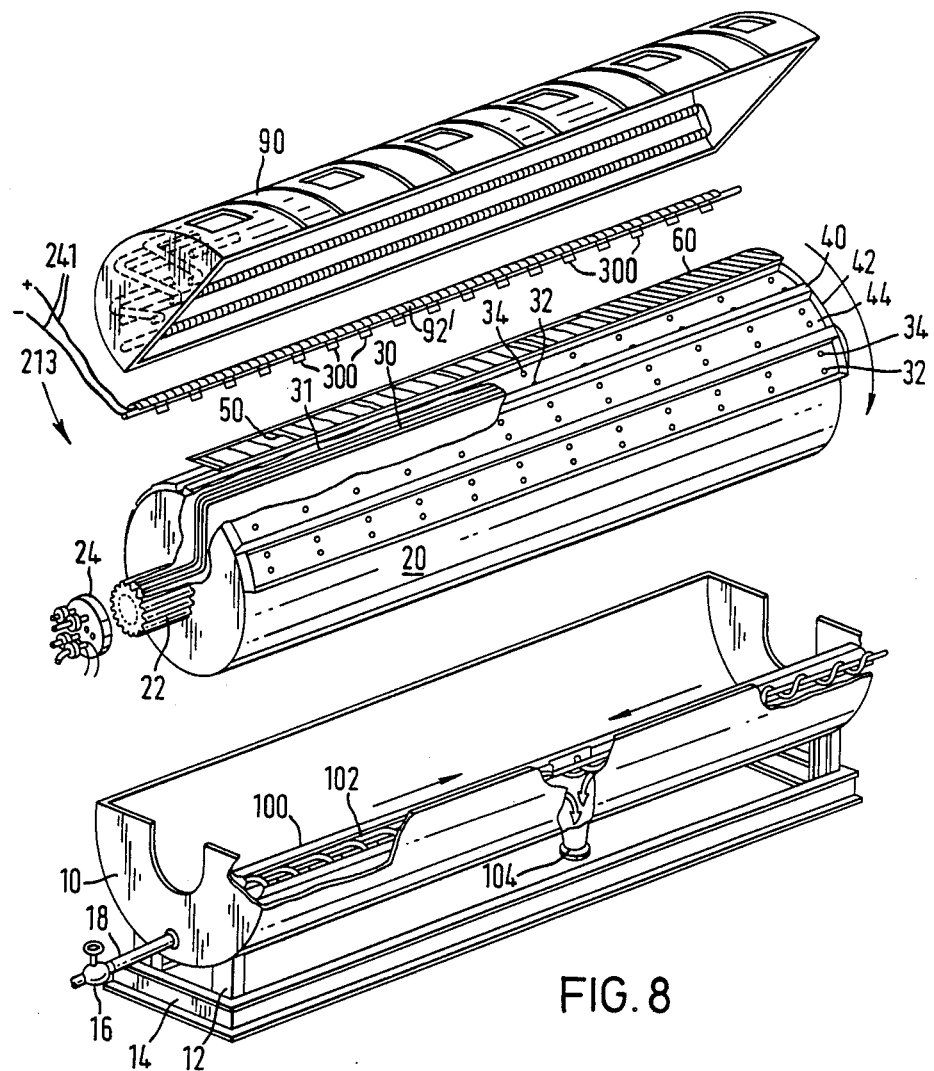
FIG. 8 is a view similar to FIG. 4 but showing a modified spray header or drip pipe incorporating charge injectors for the injection of the electric charge in the FIG. 7 embodiment.
Figure 9:
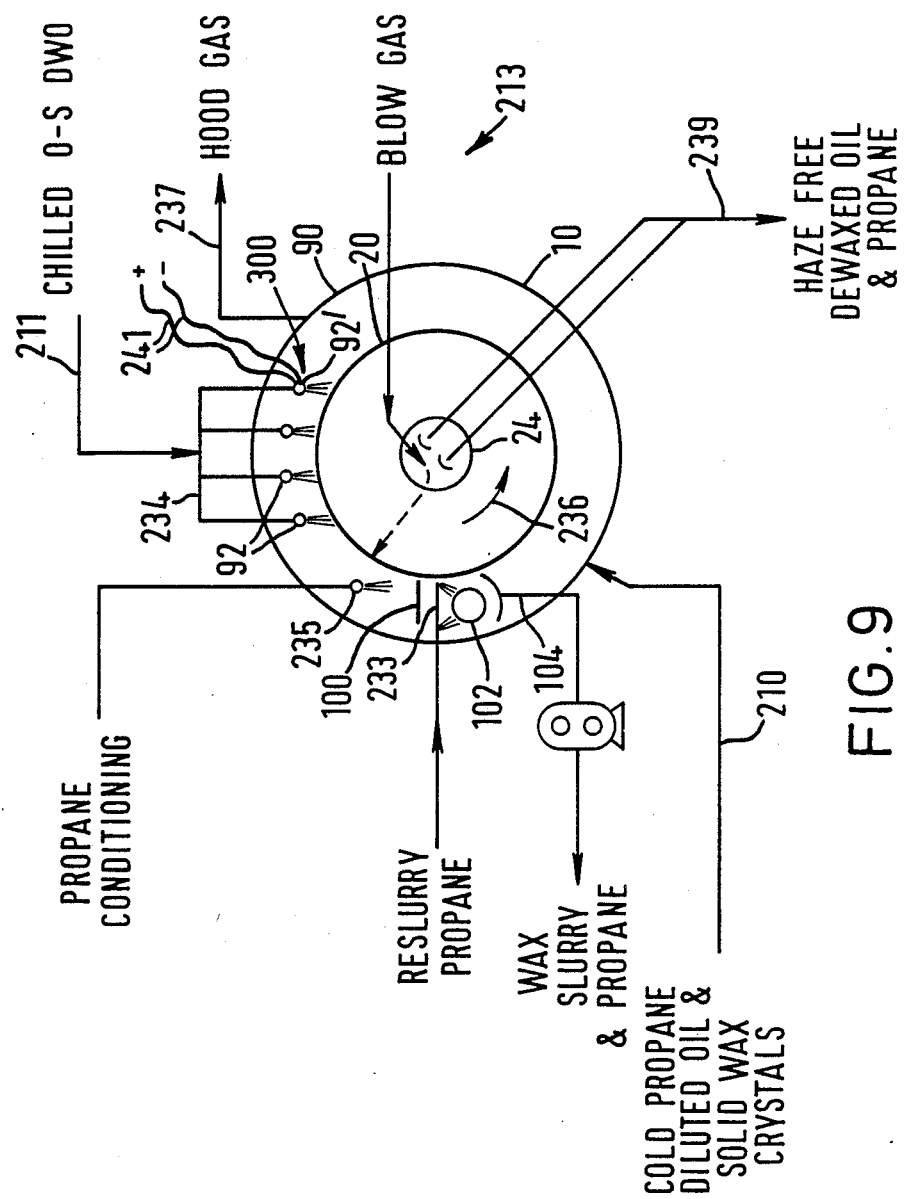
FIG. 9 is a view similar to FIG. 5 but showing an end diagrammatic view of the rotary drum filter of FIG. 8.

In the embodiment of FIGS. 7 to 10, no propane is added to the recycled hazy DWO from storage tank 203'. Instead the recycled DWO is pretreated, before introduction into the filtration stage 201, by having free excess electric charge that is net unipolar injected into it. Specifically, as shown in FIGS. 8 and 9, one of the spray headers (the "lead" spray header 92' in FIG. 9) is modified to incorporate a plurality of charge injectors 300 at the axially separated locations of the spray orifices of the spray header 92', so as to inject charge into the chilled "0-S" DWO sprayed through the spray header orifices. Electrical power supply leads for the charge injectors 300 are indicated at 241 in FIGS. 8 and 9. It is remarked that it is sufficient to include charge injectors in the one spray header 92', because the injected charge will be distributed throughout the chilled out-of-specification DWO on the wax cake on the filter drum where the sprayed DWO from the several spray headers 92 becomes mixed with the sprayed DWO from the leading spray header 92'. In addition, it is not essential that it be the leading spray header which includes the charge injectors. They could be incorporated in one (or more) of the other spray headers instead.

Figure 10:
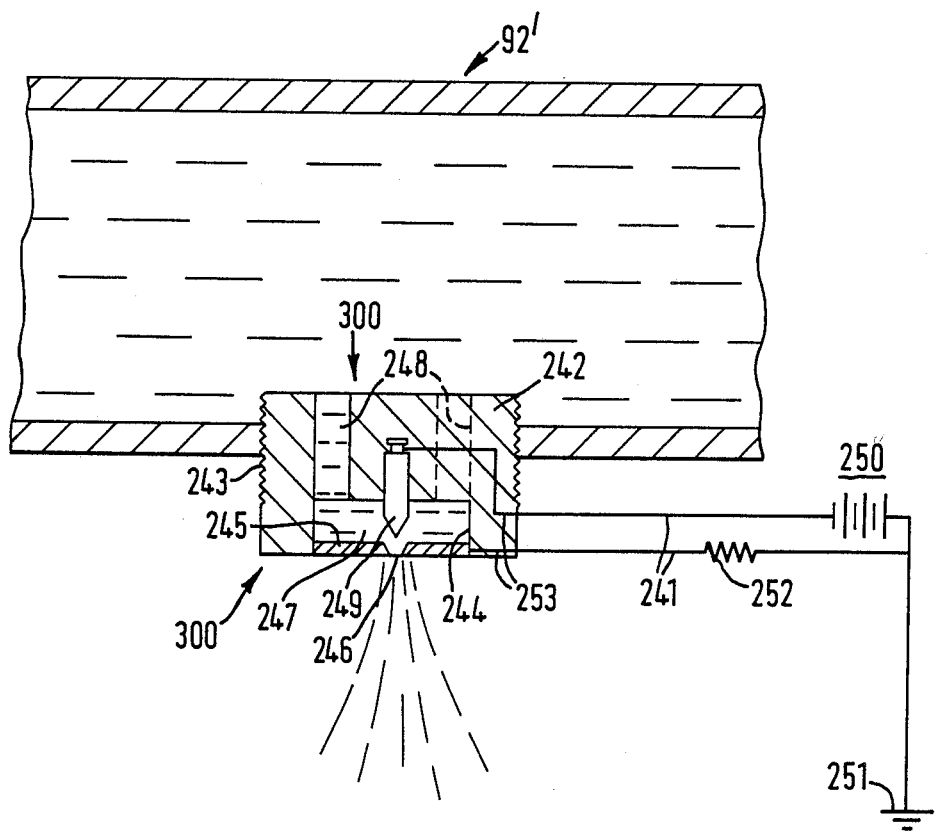
FIG. 10 is a longitudinal sectional view through a part of the spray header or drip pipe showing in more detail the construction of each charge injector.
Figure 11:
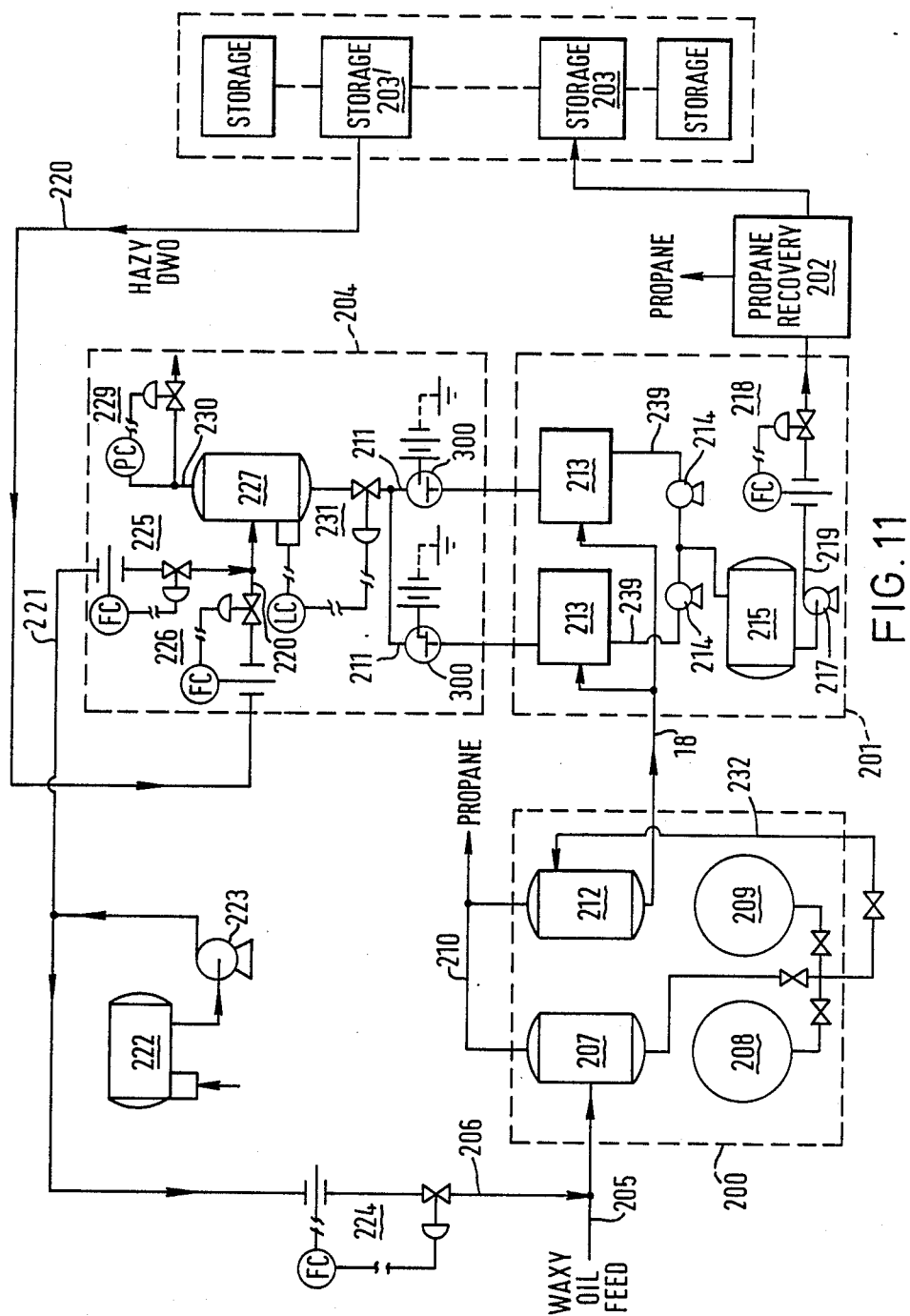
FIG. 11 is a view similar to FIG. 3 but in which the recycled hazy oil is pretreated by adding propane to the oil, chilling the resulting admixture and then injecting charge into the admixture.

With reference now to the detailed longitudinal sectional view through one of the charge injectors 300 as shown in FIG. 10, the charge injector is mounted in an opening in the underside of the spray header. This opening is internally screwthreaded for normally receiving an externally screwthreaded nozzle containing a spray orifice, this being the preferred constructional arrangement for spray headers 92. In this way spray header 92' is a simple adaptation of spray header 92 in which the spray nozzles are unscrewed and charge injectors are inserted in their place. The charge injector comprises a body 242 of cylindrical shape formed with an externally screwthreaded portion 243 which is interengaged with the internal screwthread of the opening in the header wall underside. The body 2 comprises a cylindrical block of electrically insulative material in which a blind cylindrical recess 244 is formed in the lower region. The charge injector includes a bottom wall 245 in the form of a circular electrically conductive plate, with a central opening 246, which closes off the blind recess at the bottom to define an enclosed space or chamber 247 within charge injector body 242. This enclosed space communicates by means of a plurality of axial passageways 248, drilled in cylindrical block 242, with the inside of header 92'. A pointed high potential electrode 249 is embedded in the material of the charge injector body 242 and arranged with its pointed tip projecting into enclosed chamber 247 in alignment with orifice 246 in electrode plate 245 and terminating a short distance from the electrode plate. The electrical supply leads 241 are respectively connected to conductor buses 253 which are embedded in the material of the charge injector body and are connected at one end to the pointed, high potential, electrode 249 and to the electrode plate 245, respectively, and project at their other ends through the side wall of the charge injector body 242 where they are respectively connected, by the supply leads 241, to the negative terminal of a high voltage power supply 250, whose positive terminal is connected to earth 251, and directly to earth 251 through a resistance element 252. The charge injector 300 has been briefly described above but further details may be ascertained by referring to the aforesaid Kelly U.S. Pat. No. 4,255,777.

In operation, out-of-specification DWO in header 92' enters the charge injectors 300 through the axial passageways 248. In each charge injector the DWO flows from the axial passageways 48 into the enclosed chamber 247 and exits the charge injector through orifice 246. Free excess electric charge which is net unipolar is injected from the pointed tip of electrode 249, by the electrode pair 245, 249, into the DWO which issues through the orifice 246 and streams or sprays through the vapor space inside the rotary drum filter hood 90, onto the wax cake on the filter drum. The vapor space is important in helping to minimise dissipation of charge from the wax cake back to the charge injectors, which if allowed to occur would reduce the effectiveness of the filter in collecting and separating wax from the recycled hazy DWO. The injected charge is volumetrically distributed within the lube oil and is thereby transferred to the wax haze in the DWO sprayed onto the wax cake by the headers 92, 92'. The charge promotes collection of wax haze on the already formed wax cake on the filter drum.

The recycled DWO is not chilled, but because the filter is operated at sub-freezing temperatures, e.g. $-30°$ F., water haze in the form of fine dispersed droplets in the recycled DWO will be converted into ice crystals on coming into contact with the wax cake and, assisted by the effect of the charge injection, will deposit on the wax cake.

The embodiments of FIGS. 11 to 14 combine the benefits of solvent (propane) addition and chilling with charge injection. The Figure embodiment is identical with that of FIG. 3, except that the leading spray header of each rotary drum filter is fitted with charge injectors 300 so that before the chilled hazy DWO and propane admixture from flash drum 227 is introduced into the rotary drum filters 213, charge is injected into it. Enhanced collection of not only wax but also ice crystals on the drum cake is achieved. According to a modification, the propane addition to the recycled hazy DWO can be achieved by branching off a proportion of the DWO and propane in line 219 and introducing that proportion into the hazy DWO in line 220 (as in the FIG. 6 embodiment). Then, propane in surge drum 222 is pumped only to the waxy oil feedline 205.

Figure 12:
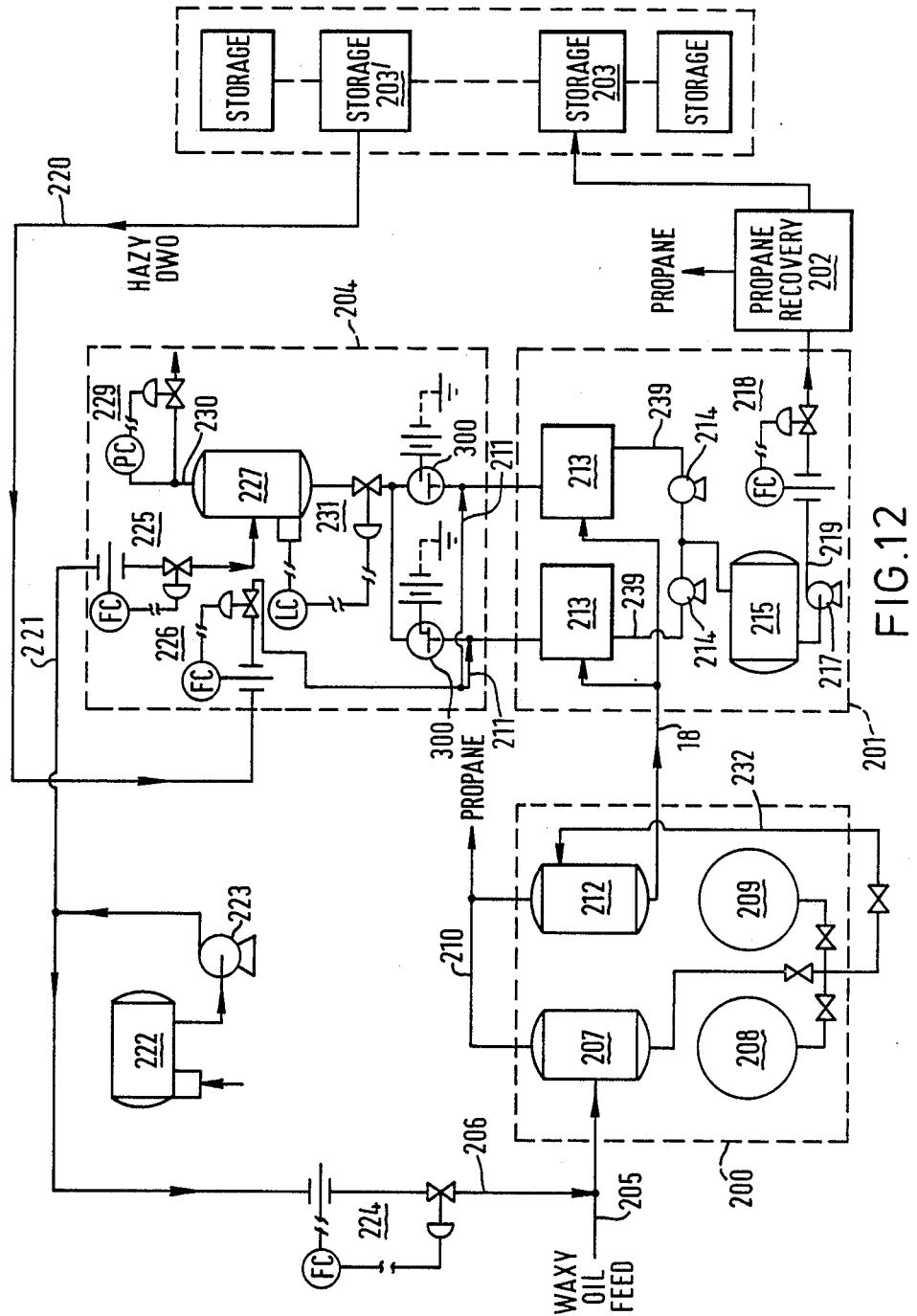
FIG. 12 is a modification to FIG. 11 in which, in the pretreatment stage, the charge is injected into the propane and then the out-of-specification lube oil is admixed with the charged propane before introduction into the filtration unit.
Figure 13:
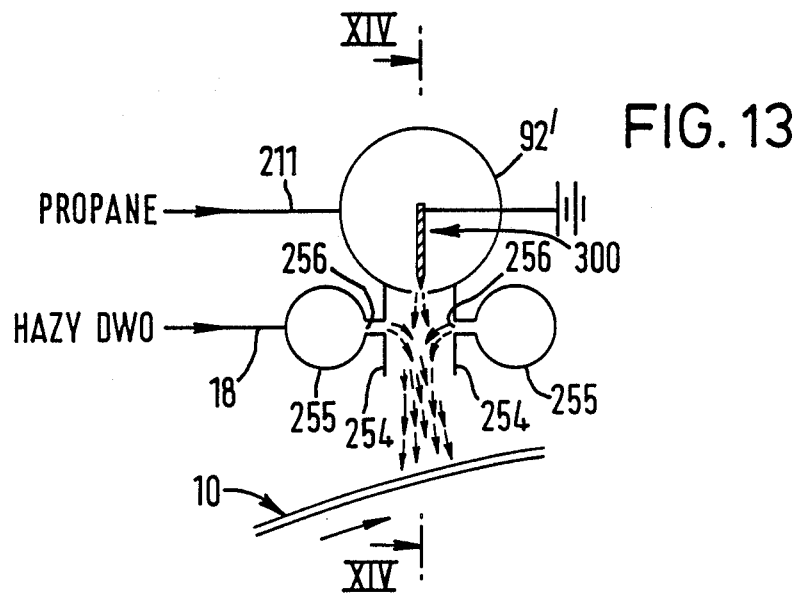
FIG. 13 is a cross-sectional view through a modified spray header or drip pipe employed in the FIG. 12 embodiment.
Figure 14:
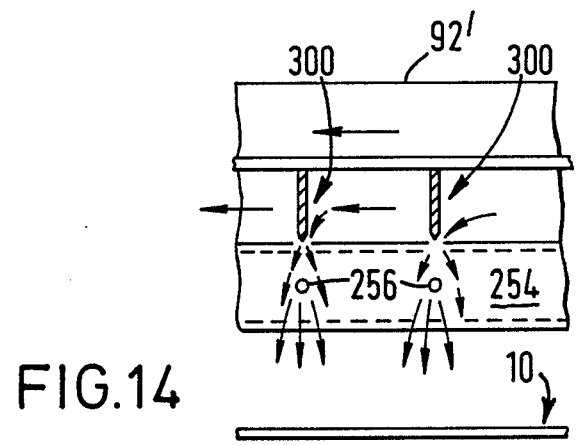
FIG. 14 is a sectional view taken along the section line XIV—XIV of FIG. 13.

In the case of the embodiment of FIGS. 12 to 14, to avoid the risk of the charge injector spray orifices becoming plugged with wax and ice deposits which could be a problem where the hazy oil has a relatively high viscosity, charge is injected, by charge injectors 300, into the chilled liquid propane from the flash drum 227 and the charged propane streams or sprays downwardly through the spray orifices in the underside of the spray header 92'. Two downwardly projecting guide plates 254 are secured to the underside of spray header 92' and extend over substantially the whole length of the spray header. These guide plates are respectively arranged so as to be positioned one at each side of the several sprays of charged propane produced by the charge injectors. Two distributor pipes 255, extending alongside the guide plates 254, are fed with hazy DWO from the one line 18 and communicate, through spray openings 256 disposed at the same axial locations as the charge injector orifices, with the space between the guide plates 254 so that hazy DWO is sprayed through these openings 256 and becomes entrained by and intimately mixed with the charged propane spray from each charge injector 300. The several such combined sprays impinge upon the wax cake on the rotating filter drum and the combined effects of the injected charge and the chilled liquid propane cause the formation of wax and ice crystals which are collected on the wax cake.

It is to be understood that the foregoing disclosure and description are only illustrative and explanatory of the invention. Various changes in and modifications to the components of the inventive apparatus and methods, as well as in the details of the illustrated apparatus and of the disclosed processes, may be made within the scope of the appended claims without departing from the spirit of the invention. For example, the flash drum 227 in each embodiment can be replaced by a control valve across which the DWO oil/propane (or propane alone, as the case may be) is flashed to produce the required chilling. Furthermore, in some instances in the FIGS. 3 to 5 and 6 embodiments, it may be possible to dispense with the flash drum (or any other chilling means) altogether, providing the temperature of the cold wax cake is low enough to produce adequate crystallisation and separation of wax from the hazy DWO and propane sprayed onto the wax cake. In that case, the propane serves principally purely as a diluent and oil solvent. It may even be possible to dispense with the propane or any other solvent altogether and merely spray uncharged hazy DWO onto the cold wax cake, relying upon the wax cake temperature to cool the haze sufficiently for effecting separation thereof on the already formed wax cake.

It is also pointed out that in the embodiments of FIGS. 3 to 14, propane is a preferred oil solvent but reference to it is not to be construed as implying that propane is the only solvent which could be used. Other oil solvents, e.g. a ketone, which act as refrigerants are well known in the art and can be used instead. Furthermore, the invention is not to be regarded as confined to the particular forms of dilution and chilling stage or to the particular filtration stage which are disclosed herein, i.e. batch chillers and rotary drum filters. For example, in ketone dewaxing the waxy oil feed typically is chilled continuously to the desired filtration temperature in a series of double pipe "scraped surface" exchangers and chillers used in place of the batch chillers disclosed hereinabove. In addition, rotary drum filters are normally used in both propane and ketone dewaxing but it will be understood that the invention finds application generally to dewaxing plant having any kind of filtration stage which includes filter units which separate wax and ice crystals from the solvent-diluted oil.

What is claimed is:

1. A method of removing haze from dewaxed hydrocarbon oil mixture boiling in the lubricating oil range which is hazy, comprising the steps of (a) passing undewaxed hydrocarbon oil mixture boiling in the lubricating oil range through a dewaxing plant including a filtration stage, (b) introducing the hazy oil mixture into the dewaxing plant directly at its filtration stage, so as to combine the hazy oil mixture and the undewaxed oil mixture and subject them to concurrent filtering in said filtration stage, and (c) introducing free charge which is net unipolar into the hazy dewaxed oil mixture before that oil mixture is combined with the undewaxed oil mixture, the introduction of free charge being effected at least predominantly by electron emission which causes the dewaxed hydrocarbon oil mixture to act as a medium through which volumetric distribution of the introduced charge takes place by charge motion relative to the dewaxed hydrocarbon oil mixture, there being a sufficient excess of free charge introduced such that the volumetric charge distribution causes, in the filtration stage of the dewaxing plant, both an electric field to be induced in the oil mixture in said filtration stage and the haze therein to become charged, and the induced electric field and the charge on the haze interact to produce an electrical driving force acting on the haze to promote removal of haze from the dewaxed oil mixture during the filtering.

2. A method as claimed in claim 1, wherein the free charge is introduced by flowing a stream of the hazy dewaxed oil mixture past a pointed high potential electrode at sufficient velocity that free charge is injected by field emission into the dewaxed oil mixture and is conveyed by the flowing stream away from the high potential electrode.

3. A method as claimed in claim 1, wherein the free charge is introduced without producing ionic dissociation within the dewaxed oil mixture.

4. A method as claimed in claim 1, comprising the further step of reducing the solubility of the hazy dewaxed oil mixture for wax and water to promote wax and ice crystallization, after which said free charge is introduced into the dewaxed oil mixture.

5. A method as claimed in claim 4, wherein said wax and water solubility is reduced by cooling the hazy oil mixture.

6. A method as claimed in claim 5, wherein an oil solvent liquid is added to the hazy oil mixture to promote wax and ice crystallization.

7. A method as claimed in claim 6, wherein said oil solvent liquid is an auto-refrigerant liquid which is partially vaporized so as to reduce the temperature of the hazy oil mixture.

8. A method as claimed in claim 6, wherein said oil solvent liquid is liquid propane and the admixture of hazy oil mixture and added propane is passed through a flash drum for chilling said admixture 9. A method as claimed in claim 1, wherein the free charge is introduced into the hazy dewaxed oil mixture by firstly introducing the free charge into an auto-refrigerant liquid, which has already been allowed to partially vaporize so as to self-chill, and then intimately mixing the charged chilled auto-refrigerant liquid and the hazy dewaxed oil mixture, so that charge transfers to the hazy dewaxed oil mixture and the chilled auto-refrigerant liquid reduces the temperature of the dewaxed oil mixture to promote wax and ice crystallization of the haze in the dewaxed oil mixture.

10. A method as claimed in claim 1, wherein the undewaxed oil mixture is introduced into a filter vat of a rotary drum filter for performing the filtration and wherein the charged hazy dewaxed oil mixture is sprayed through a gas or vapor space onto the wax cake formed on the filter drum, whereby said dewaxed oil mixture is filtered in the filtering means concurrently with filtration of said undewaxed oil mixture.

11. A method as claimed in claim 1, wherein, in step (c), net unipolar free charge is introduced into a laterally constrained flow of hazy dewaxed oil mixture and the charged flow is issued from at least one orifice as a spray or stream passing through a gas or vapor space before reaching said filtration stage.

* * * * *